(12) United States Patent
Wijning et al.

(10) Patent No.: US 12,331,719 B2
(45) Date of Patent: Jun. 17, 2025

(54) INSTALLATION OF A WIND TURBINE ON A FLOATING FOUNDATION

(71) Applicant: Itrec B.V., Schiedam (NL)

(72) Inventors: Diederick Bernardus Wijning, Schiedam (NL); Joop Roodenburg, Schiedam (NL)

(73) Assignee: ITREC B.V., Schiedam (NL)

( * ) Notice: Subject to any disclaimer, the term of this patent is extended or adjusted under 35 U.S.C. 154(b) by 235 days.

(21) Appl. No.: 18/033,097

(22) PCT Filed: Oct. 19, 2021

(86) PCT No.: PCT/EP2021/078995
§ 371 (c)(1),
(2) Date: Apr. 21, 2023

(87) PCT Pub. No.: WO2022/084344
PCT Pub. Date: Apr. 28, 2022

(65) Prior Publication Data
US 2023/0392584 A1    Dec. 7, 2023

(30) Foreign Application Priority Data

Oct. 22, 2020  (NL) ..................................... 2026733
Jan. 6, 2021  (NL) ..................................... 2027280

(51) Int. Cl.
*F03D 13/25*      (2016.01)
*F03D 13/10*      (2016.01)

(52) U.S. Cl.
CPC .......... *F03D 13/256* (2023.08); *F03D 13/112* (2023.08); *F03D 13/126* (2023.08);
(Continued)

(58) Field of Classification Search
CPC .... F03D 13/256; F03D 13/126; F03D 13/139; F03D 13/112; E02B 2017/0091
See application file for complete search history.

(56) References Cited

U.S. PATENT DOCUMENTS

| | | | | |
|---|---|---|---|---|
| 7,293,960 B2 * | 11/2007 | Yamamoto | ............. | F03D 13/10 60/497 |
| 8,316,614 B2 * | 11/2012 | Soe-Jensen | ............... | B66C 1/62 416/142 |

(Continued)

FOREIGN PATENT DOCUMENTS

| | | |
|---|---|---|
| EP | 2 952 426 A1 | 12/2015 |
| JP | 2015-168485 A | 9/2015 |
| WO | WO 2009/131826 A2 | 10/2009 |

OTHER PUBLICATIONS

Dutch Search Report, issued in Priority Application No. 2027280, dated Sep. 22, 2021.
(Continued)

*Primary Examiner* — Benjamin F Fiorello
(74) *Attorney, Agent, or Firm* — Birch, Stewart, Kolasch & Birch, LLP

(57) ABSTRACT

In an installation of a wind turbine on a floating foundation in floating condition and subject to sea-state induced motions, e.g. at the site of an offshore windfarm, use is made of a vessel with a crane arranged on the hull and provided with a hoisting system adapted to support the weight of the wind turbine and suspend the wind turbine from the crane. A heave compensation device compensates for sea-state induced heave motion of the wind turbine mast relative to the mast mounting structure of the floating foundation. Use is made of a mast alignment system configured to engage on the suspended wind turbine, e.g. on the mast of the suspended wind turbine, and to bring and maintain the mast of the wind turbine in alignment with the mounting axis of the floating foundation in order to compensate for sea-state induced motions, at least including tilt motions in one or more vertical planes, of the wind turbine mast relative to the mounting axis of the floating foundation.

21 Claims, 17 Drawing Sheets

(52) U.S. Cl.
CPC ...... *F03D 13/139* (2023.08); *F05B 2230/604* (2013.01); *F05B 2240/93* (2013.01); *F05B 2240/95* (2013.01)

(56) References Cited

U.S. PATENT DOCUMENTS

| | | | | |
|---|---|---|---|---|
| 8,701,579 | B2* | 4/2014 | Roodenburg | B63B 1/107 |
| | | | | 405/209 |
| 8,727,690 | B2* | 5/2014 | Springett | B63B 35/00 |
| | | | | 414/10 |
| 11,945,693 | B2* | 4/2024 | Sexton | B66C 1/108 |
| 2007/0243063 | A1* | 10/2007 | Schellstede | E02D 27/42 |
| | | | | 416/10 |
| 2011/0119889 | A1 | 5/2011 | Numajiri | |
| 2016/0229494 | A1* | 8/2016 | Bergua | B63B 35/44 |
| 2017/0120993 | A1* | 5/2017 | Amate López | F03D 13/25 |
| 2019/0071830 | A1 | 3/2019 | Lindblade et al. | |
| 2021/0123203 | A1* | 4/2021 | Rabaut | E02D 13/04 |
| 2021/0394874 | A1* | 12/2021 | Bowie | B63B 35/44 |

OTHER PUBLICATIONS

International Search Report, issued in PCT/EP2021/078995, dated Jan. 20, 2022.
Written Opinion of the International Searching Authority, issued in PCT/EP2021/078995, dated Jan. 20, 2022.

* cited by examiner

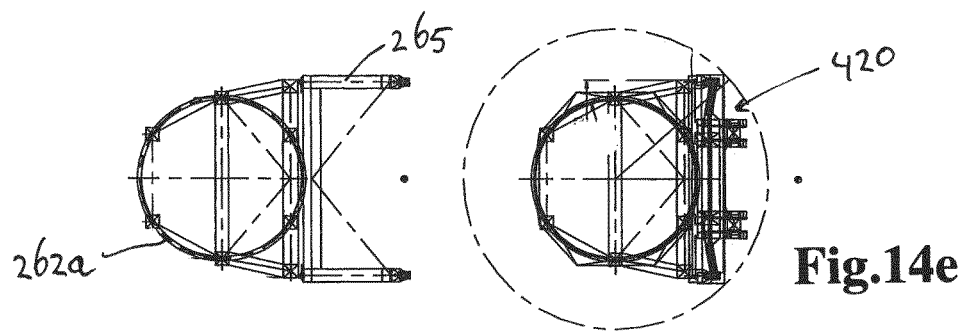
Fig.14d
Fig.14e
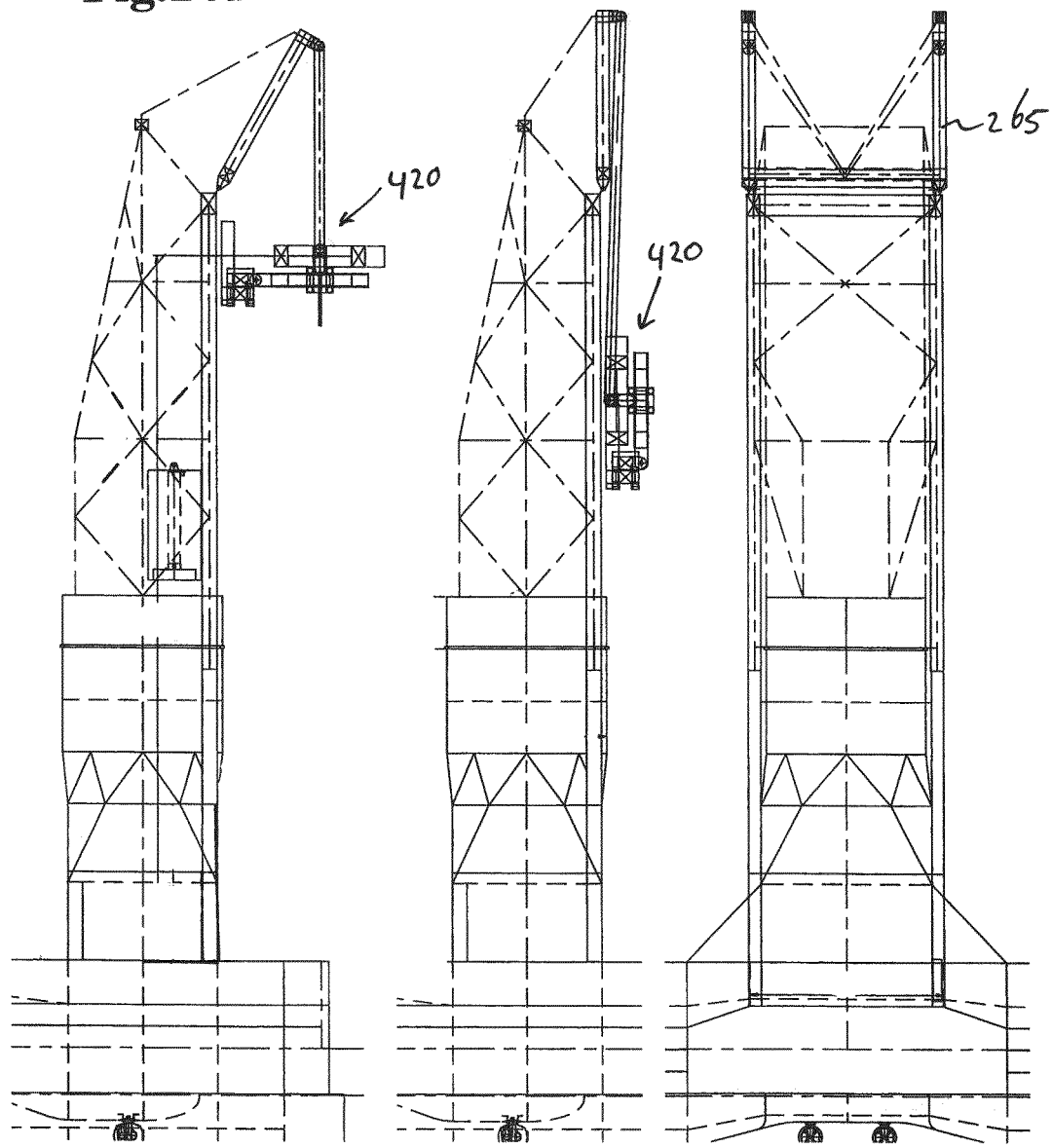
Fig.14a
Fig.14b
Fig.14c

INSTALLATION OF A WIND TURBINE ON A FLOATING FOUNDATION

FIELD OF THE INVENTION

The present invention relates to the installation of a wind turbine on a floating foundation.

BACKGROUND OF THE INVENTION

In the field of offshore windfarms it is known to install a fixed foundation on the seabed, e.g. a jacket or a monopile, and to then install the wind turbine on top of the fixed foundation. The latter of commonly done in a step-by-step approach, e.g. wherein first the mast is installed on the pre-installed foundation, then the nacelle is mounted on the top of the mast, and then the rotor blades are fitted to the hub of the nacelle. Other approaches, e.g. wherein a nacelle already fitted with two (of the three) rotor blades is supplied in the so-called bunny ears configuration, are also known.

Fixed foundation offshore wind turbines are effective in relatively shallow waters. In deeper waters it is envisaged that floating foundation wind turbines will be most effective, e.g. economical. For example, the document WO2009/131826 discloses several designs of floating foundation wind turbines.

In the field of floating foundation wind turbines it is at present the common understanding that assembly of the entire floating foundation wind turbine, so the combination of the floating foundation and of the wind turbine, is done remote from the actual windfarm. For example, assembly is done at a port-based yard. The entire floating foundation wind turbine is the towed from the assembly location to the remote offshore windfarm location.

For example, Hywind Scotland is a wind farm using floating foundation wind turbines. These wind turbines have a 120 meters tall mast mounted on a spar-type floating foundation. The mounting of the wind turbines on the spar-type floating foundation was done in a fjord in Norway using the Saipem 7000 floating crane. The assemblies were then towed across the North Sea to the coast of Scotland near Peterhead. In the windfarm, three suction anchors anchor the floating foundation to the seabed.

OBJECT OF THE INVENTION

The present invention aims to provide an alternative approach for assembly floating foundation wind turbines and/or for creating a windfarm with one or more floating foundation wind turbines.

SUMMARY OF THE INVENTION

The invention provides a method for installation of a wind turbine on a floating foundation that is in floating condition and subject to sea-state induced motions.

As preferred, this installation is done at the site of the offshore windfarm. It will be appreciated that this allows to avoid the long-distance towing of the complete wind turbine from a shore-based, e.g. quayside, location to the windfarm. Such towing takes considerable efforts, is time-consuming, and may be impaired by weather conditions.

More preferably, the floating foundation is already anchored, e.g. with at least a part of the anchoring arrangement, to the seabed at its final location in the windfarm prior to the installation of the wind turbine on the foundation.

The wind turbine to be installed comprises a wind turbine mast having a lower end portion, and comprises a rotor assembly with rotor blades, which rotor assembly is mounted on the wind turbine mast. The mast of the wind turbine to be installed may be the entire mast, which is preferred, but may also consist of an upper mast part only, with the lower mast part being integral with the floating foundation.

The floating foundation comprises a mast mounting structure configured to mount the mast of the wind turbine thereon and having an upwardly directed mounting axis. The foundation may be of any design, e.g. of any designs disclosed in WO2009/131826.

For example, the floating foundation comprises three or more interconnected and buoyant stabilizing columns, e.g. three stabilizing columns interconnected by beams in a triangular arrangement, e.g. an equilateral triangle, when seen from above.

For example, the floating foundation, e.g. each buoyant column thereof, is provided with one or more ballast tanks for containing a ballast, e.g. a ballast liquid, e.g. ballast water. In an embodiment, a ballast control system is provided which is configured for moving the ballast liquid between ballast tanks, e.g. of the at least three stabilizing columns, to adjust a vertical orientation of the upwardly directed mounting axis.

In an embodiment, one of the stabilizing columns of the floating foundation is embodied with a mast mounting structure configured to mount the mast of the wind turbine thereon.

In an embodiment, the floating foundation comprises one or more water-entrapment plates, e.g. each of the plates being attached to a lower end of one of the stabilizing columns.

In the method use is made of a vessel which comprises:
- a floating hull, e.g. a semi-submersible type vessel, e.g. a non-jack-up type vessel,
- a crane arranged on the hull.

The crane is provided with a hoisting system that is adapted to support the weight of the wind turbine and suspend the wind turbine from the crane, which hoisting system is adapted to raise and lower the wind turbine in a controllable manner.

At the site of the offshore windfarm, in contrast to a (shielded) shore-based, e.g. quayside, installation location, the wave conditions are likely to be (over the year) more prominent, so that the floating foundation as well as the crane vessel will be subject to sea-state induced motions, generally each with its own dynamic behavior.

The crane of the vessel and/or the hoisting system thereof comprises a heave compensation device that is adapted to compensate for sea-state induced heave motion of the wind turbine mast relative to the mast mounting structure of the floating foundation. In particular for a hoisting device with one or more hoisting winches and hoisting cables, as is preferred here, suitable heave compensation devices are well known in the art, both in passive and active embodiments or hybrids thereof. For example, the hoisting device includes one or more winches and one or more hoisting cables, the heave compensation being formed by suitable operation of the (electric) winches and/or by one or more heave compensation cylinders carrying one or more cable sheaves over which a hoisting cable is passed.

In the method use is made of a mast alignment system that is configured to engage on the suspended wind turbine, e.g. on the mast of the suspended wind turbine, and to bring and maintain the mast of the suspended wind turbine in alignment with the mounting axis of the floating foundation in order to compensate for sea-state induced motions, at least including tilt motions in one or more vertical planes, of the wind turbine mast relative to the mounting axis of the floating foundation.

The method comprises—with the hull of the vessel in floating condition and the floating foundation in floating condition—the steps of:

suspending the wind turbine from the crane by means of the hoisting system, positioning the lower end of the mast of the suspended wind turbine above the mast mounting structure of the floating foundation, operating the heave compensation device so as to compensate for sea-state induced heave motion of the wind turbine mast relative to the mast mounting structure of the floating foundation, operating the mast alignment system so as to bring and maintain the mast of the wind turbine in alignment with the mounting axis of the floating foundation in order to compensate for sea-state induced tilt motions of the wind turbine mast relative to the mounting axis of the floating foundation, whilst the heave compensation device and the mast alignment system are in operation, operating the hoisting system and thereby lowering the suspended wind turbine with the lower end portion of the mast onto the mast mounting structure of the floating foundation, fastening the mast with the lower end portion thereof to the mast mounting structure of the floating foundation.

The method thus envisages the provision and operation of a mast alignment system in order to allow for the correct landing of the lower end portion of the mast onto the mast mounting structure of the floating foundation. In general terms, the mast alignment system serves to force the suspended wind turbine out of its plumb line orientation so as to bring and keep the mast thereof in alignment with the mounting axis, which is continuous subject to at least tilting motions relative to the mast due to sea-state acting on the floating hull of the vessel and on the floating foundation.

The invention allows, for example, to anchor multiple floating foundations at their final location in an offshore windfarm, all without wind turbine, and then sail the vessel to the windfarm and successively install the wind turbines on the floating foundations. This approach allows for a more (cost-)effective approach to establishing a floating foundation offshore windfarm than the above-referenced approach wherein completely assembled floating wind turbines have to be towed over relatively long distance to their location in the windfarm. In an embodiment, floating foundations of a windfarm are installed in one calendar year and the associated wind turbines are installed on these foundations in a later calendar year.

The invention, for example, allows for the use of deep draught floating foundations, e.g. spar-type foundations, without the need for a deep draught installation location close to shore, like the above-referenced fjord.

In embodiments, landing the mast onto the mast mounting structure may already cause, or is followed by, a preliminary fastening between the mast and the foundation being established, so that the wind turbine is stable relative to the foundation, e.g. allowing for ceasing the operation of the alignment system, e.g. allowing for disengaging the alignment system.

For example, the lower end portion of the mast is configured for stabbing thereof into or over the mast mounting structure of the floating foundation, said stabbing connection providing a stable preliminary fastening between the mast and the foundation. For example, the lower end portion of the mast and the floating foundation are configured to establish a slip joint connection. Generally a slip joint includes one or more pairs of mating conical engagement surfaces. In another embodiment, the mast is composed of a lower mast part and an upper mast part with a slip joint connecting the two mast parts, e.g. the lower mast part being already mounted to the floating foundation. Providing a slip joint allows for comparatively quick installation and may optionally facilitate later de-installation of the wind turbine. For example, in a slip joint connection the relative angular orientation of the mating parts—influenced by sea state—may be less critical compared to the traditional flanges with only a bolted connection.

In an example, one or more preliminary fastener devices are provided at the lower end portion and/or on the mast mounting structure that establish, e.g. automatically or on command, a preliminary fastening between the mast and the foundation. Then a final fastening of the lower end portion to the mast mounting structure may be performed, e.g. providing a connection by bolts, welding, grouting, etc.

In an embodiment, the lower end portion of the mast and the mast mounting structure are provided with cooperating self-actuating fastening members, e.g. like an automatic latch, that fasten the mast to the foundation In embodiments, at least the mast alignment system remains in operation during a part or all of the fastening step, e.g. the system serving or assisting in stabilizing of the wind turbine relative to the foundation during this step.

In embodiments, at least the heave compensation device remains in operation during a part or all of the fastening step, e.g. the device serving or assisting in supporting at least part of the weight of the wind turbine relative to the foundation also during this step. In another embodiment, the weight of the wind turbine is transferred from the crane onto the floating foundation once the lower end portion of the mast has been lowered onto the mast mounting structure of the floating foundation. This can be done, e.g. by suitable operation of the hoisting system and/or the heave compensation device.

In a preferred installation method—at least during the step of lowering the mast onto the foundation—the vessel is facing the waves with its bow or its stern. Most preferably, the vessel is embodied to suspend the wind turbine at the bow or the stern of the vessel, preferably in the mid-plane of the vessel.

In a practical embodiment, the vessel is equipped with a dynamic positioning system, often referred to as DP-system, as is known in the art. For example, the water depth may be such that mooring of the vessel with anchors to the seabed is impractical.

It is preferred, for the floating foundation to be restrained by a restraining system at least, or solely, in the horizontal plane relative to the vessel, at least to some degree, during the wind turbine installation process. The restraining can, for example, involve multiple mooring lines extending in different directions, e.g. at least three mooring lines, being arranged between the floating foundation on the one hand and hull of the vessel on the other hand, so as to provide a coupling of the floating foundation and the hull at least, or solely, in the horizontal plane.

In an embodiment, the restraining system is provided at the bow of the semi-submersible vessel.

The restraining of the floating foundation can also, for example, involve the use of a vessel mounted gripper device, e.g. like a monopile gripper known for installation of monopiles in the seabed, which gripper device has an engagement member, e.g. a ring member, that engages on the floating foundation, e.g. on the mast mounting structure of the floating foundation, and which gripper device has active controlled motion mechanism configured and operated to provide a controlled motion of the engagement member relative to the hull of the vessel and thereby a controlled restraining of the engaged floating foundation relative to the hull of the vessel. For example, the active controlled motion mechanism is embodied to actively restrain the engaged floating foundation relative to the hull of the vessel in at least one horizontal direction, possibly in two non-parallel horizontal directions, e.g. in orthogonal horizontal directions.

In an embodiment, the vessel is provided with tensioner lines, preferably at least two tensioner lines, configured for securing the vessel to the foundation and for reducing vertical movement of the floating foundation relative to the vessel.

Even when use is made of a restraining system that at least to some degree restrains motion of the mast mounting structure relative to the vessel in the horizontal plane, or when such restraining is not present, an embodiment of the invention envisages that the mast alignment system is also configured to compensate for sea-state induced horizontal motions of the wind turbine mast relative to the mounting axis of the floating foundation in at least one horizontal direction, e.g. in two non-parallel horizontal directions, e.g. in two orthogonal horizontal directions. In this embodiment, the alignment system also takes care of relative horizontal motion of the lower end portion of the mast and the mast mounting structure, in addition to the mentioned relative tilt motions.

In an embodiment, the alignment system comprises at least one mast engaging device having a mast engagement member as well as an active controlled motion mechanism configured and operated to provide a controlled motion of the mast engagement member in a horizontal plane so as to bring and maintain the mast of the suspended wind turbine in alignment with the mounting axis of the floating foundation. The at least one mast engaging device is generally envisaged to actively force the suspended wind turbine out of its plumb line orientation and into alignment with the mounting axis.

In an embodiment, the alignment system comprises an upper mast engaging device as well as a lower mast engaging device each having a mast engagement member as well as an active controlled motion mechanism configured and operated to provide a controlled motion of the mast engagement member in a horizontal plane, wherein the mast engaging devices act on the mast at different heights, e.g. the lower one below the centre of gravity of the wind turbine to be installed and the upper one above said centre of gravity, and wherein the active controlled motion mechanisms are operated to bring and maintain the mast of the suspended wind turbine in alignment with the mounting axis of the floating foundation. For example, the upper and lower mast engaging device are at least 20 meters apart in vertical direction.

In a possible embodiment the active controlled horizontal motion mechanism comprises a first set of one or more horizontal tracks extending in a first horizontal direction, said first set supporting at least one first carrier, and said one or more first carriers supporting a second set of one or more horizontal tracks extending in a second horizontal direction different from the first direction, e.g. the first and second direction being orthogonal directions, the second set of one or more horizontal tracks supporting one or more further second carriers supporting said mast engagement device.

In a practical embodiment, the active controlled horizontal motion mechanism comprises one or more horizontal displacement actuators, e.g. hydraulic cylinders or assemblies of one or more cables and associated (electric) winches, or rack and pinion drive devices.

In an embodiment, at least one, preferably each, mast engaging device of the alignment system comprises a trolley that is vertically guided, e.g. along one or more vertical guide rails, e.g. one or more vertical guide rails mounted on the hull of the vessel and/or on the crane, the trolley supporting the mast engaging member with interposition of the active controlled motion mechanism between the trolley and the mast engaging member to provide a controlled motion of the mast engagement member in a horizontal plane, e.g. in two orthogonal horizontal directions. It will be appreciated that herein, vertical and horizontal are approximate indications as the vessel is subject to sea-state induced motions.

In an embodiment, the trolley of a mast engaging device, e.g. of an upper mast engaging device, is suspended from the crane. For example, the upper mast engaging device is suspended from the crane by the same hoisting system from which the wind turbine is suspended, e.g. subject to the same heave compensation device so that the trolley moves in unison with the heave compensating motions of the wind turbine.

In an embodiment, the alignment system comprises an mast engaging device, e.g. an upper mast engaging device, that comprises a trolley that is vertically guided, e.g. along one or more vertical guide rails, e.g. one or more vertical guide rails mounted on the hull of the vessel and/or on the crane, the trolley supporting the mast engaging member with interposition of the active controlled motion mechanism between the trolley and the mast engaging member to provide a controlled motion of the mast engagement member in a horizontal plane, e.g. in two orthogonal horizontal directions, wherein the wind turbine is suspended from the mast engaging member, and wherein the mast engaging member is suspended from the crane by means of the hoisting device. In an embodiment, one or more suspension cables extend between an attachment member fitted, e.g. temporarily fitted, on the mast at a height below the upper mast engaging device and the mast engaging member. In an embodiment, the crane is provided with first and second upper sheave blocks that are horizontally spaced apart, and the mast engaging member is provided with first and second lower sheave blocks that are horizontally spaced apart, wherein a first multiple fall cable arrangement extends the between the first upper and lower sheave blocks and a second multiple fall cable arrangement extends between the second upper and lower sheave blocks. Preferably this configuration is such that in the method, the nacelle and one blade of the wind turbine that is directed upward are located between multiple fall cable arrangements without these cable arrangement coming into contact with any of the blades and the nacelle.

In an embodiment, the crane has a vertical crane structure erected on the hull of the vessel, e.g. with a pivotal jib at the top thereof wherein the hoisting device comprises one or more winch drive cables depending from one or more sheave blocks arranged on pivotal jib.

In an embodiment, the vertical crane structure has a lower section of the crane structure fixed on the hull and with a slewable top section of the crane structure, wherein the hoisting device comprises one or more winch drive cables depending from one or more sheave blocks arranged on the slewable top section, e.g. on a pivotal jib of the slewable top section. The slewing of the top section, may in embodiments, be used to pick-up an assembled wind turbine from a deck of the vessel by means of the hoisting device and to bring the wind turbine with its mast above the mast mounting structure of the floating foundation.

In an embodiment, the alignment system is mounted on a vertical crane structure of the crane, which crane structure is erected on the hull of the vessel and subject to the same sea-state induced motions as the hull of the vessel. For example, the alignment system comprises one or more mast engaging devices mounted on the vertical crane structure, e.g. each embodied as described herein.

In an embodiment, the slewable top section of the vertical crane structure is provided with the upper mast engaging device and the fixed lower section of the vertical crane structure is provided with the lower mast engaging device. For example, a vertical guide rail(s) is provided on the slewable top section for a trolley of the upper mast engaging device. For example, a vertical guide rail(s) is provided on the lower section for a trolley of the lower mast engaging device.

For example, the height of the crane structure, is be more than 75 metres above the waterline when it is desired to engage the wind turbine above or near its centre of gravity, possibly more than 100 metres.

In an embodiment, the vessel is of the type known as semi-submersible vessel with a pair of substantially parallel, laterally spaced buoyant pontoons, e.g. with water ballast tanks to permit said pontoons to be moved between a submerged condition and a surface floating condition, and with a row of multiple columns supported by and extending upwardly from each pontoon, and a deck structure supported by the upper ends of said columns. The crane is mounted on the deck structure of the hull.

In an embodiment the semi-submersible vessel has a bow and a stern, wherein the crane is mounted at the bow, e.g. on the deck structure between the two pontoons (seen from above), e.g. the deck structure having a bow end that is located aft of the bow of the pontoons.

In an embodiment, the floating foundation has a stabilizing column at a corner thereof (seen from above) on which the wind turbine is to be installed, e.g. a triangular foundation, e.g. as in WO2009/131826, wherein the semi-submersible vessel is arranged with its pontoons, e.g. the bow portions thereof, on opposite sides of this stabilizing corner and wherein the crane suspends the mast of the wind turbine above the mast mounting structure on said stabilizing column.

In an embodiment, use is made of one or more sensors for monitoring the motion in one or more directions of the mast mounting structure relative to the lower end portion of the mast during installation. Preferably, these one or more sensors are linked to a controller, e.g. a computerized controller, that is configured and operated to cause automated operation of the heave compensation device and/or of the alignment system. For example, one or more sensors are embodied as one or more camera's, radar, displacement sensors, etc.

For example, one or more of the motion monitoring sensors are combined with a restraining system as discussed herein.

For example, one or more motion monitoring sensors are configured to monitor a tilting of the mast mounting structure relative to the hull of the vessel, e.g. relative to the restraining system, e.g. about perpendicular horizontal axis, e.g. corresponding to pitch and roll directions of the vessel.

In an embodiment, the restraining system comprises at least three mooring lines that secure the floating foundation to the vessel, e.g. to the bow of the vessel, said mooring lines extending in different directions, e.g. primarily in a horizontal plane. This, for example, allows for keeping a substantially fixed relative horizontal position of the vessel and the floating foundation. Preferably, the foundation is anchored to the seabed in this configuration.

In an embodiment, the vessel is anchored via multiple anchor lines to the seabed in addition to a part of the vessel being coupled to the anchored floating foundation via the restraining system. For example, the restraining system couples the bow of the vessel, e.g. the semi-submersible vessel, to the floating foundation (e.g. a stabilizing column thereof) and one or more anchors lines extend from the stern of the vessel during the installation.

In an embodiment the restraining system, e.g. also, comprises one or more tensioning line assemblies arranged on the vessel, each including one or more tensioning lines and one or more corresponding tension devices that provide controlled tension to these tensioning lines, said tensioning lines being connected to the floating foundation and the tensioning line assemblies being configured and operated to tension said one or more lines and thereby restrain the floating foundation primarily in heave direction relative to the vessel.

It is noted that the vessel may be used for installation procedures only, whereas the supply of assembled wind turbines is done with another vessel, e.g. a barge, from an onshore location.

It is preferred that assembly of the wind turbine to be installed is done, at least for full completion thereof, onboard the installation vessel equipped with the crane for installation of the wind turbine on the floating foundation. For example, the mast is supplied to the vessel, or stored on the vessel, in two parts, a lower mast part and an upper mast part. For example, the nacelle is supplied to the vessel or stored on the vessel. For example, the blades are supplied to the vessel or stored on the vessel. Assembly of the wind turbine is then done on the vessel, e.g. in a process of which the final stage is the installation on the floating foundation as described herein. For example, in a first assembly stage the nacelle is mounted on the upper mast part. Then in a second assembly stage, the blades are fitted to the hub, e.g. involving the method and equipment as described in non-prepublished NL2026734 incorporated herein by reference. Then, in a third assembly stage, the subassembly is lifted and placed on top of the lower mast part with the mast parts being secured to one another to complete the wind turbine assembly. This assembly is then installed on the floating foundation as described herein. In embodiments, a further crane is provided on the vessel to handle the mast part(s) and/or nacelle, and/or blades during the assembly. The further crane can also be used for loading such wind turbine components onto the vessel from a supply vessel, e.g. from a barge.

In an embodiment, it is envisaged that the lower mast part is already mounted on the floating foundation, e.g. during the production thereof. For example, the lower mast part has a height of at least 30% of the total mast height. Then the subassembly of upper mast part, nacelle, and rotor blades is lifted and installed on the top of the of the lower mast part with the mast parts being secured to one another.

For example, the vessel sails to the windfarm where the floating foundations are already anchored with multiple wind turbines in yet to be assembled state stored on the vessel, e.g. at least 5 wind turbines, e.g. storing separately the upper mast parts, lower mast parts, nacelles, and rotor blades of at least 5 wind turbines on board the vessel. In another embodiment, nacelles are already provided with two blades in the so-called bunny ears configuration.

In an embodiment, the vessel comprises one or more quick fill water ballast tanks configured for holding ballast water below the water line, the quick fill ballast tanks comprising ballast water fill doors located below the water line for dumping sea water into the quick fill ballast tanks, e.g. during and/or just after lowering the mast onto the floating foundation in order to compensate for the weight transfer from the vessel to the foundation caused by the landing of the wind turbine on the floating foundation.

In an embodiment, the floating foundation is provided with one or more quick release water ballast tanks configured for holding ballast water above the water line, the quick release ballast tanks comprising ballast water dump doors, preferably located above the water line, for dumping ballast water, e.g. during and/or just after lowering the mast onto the floating foundation, to compensate for the weight transfer from the vessel to the foundation caused by the landing of the wind turbine.

It is noted that in an alternative embodiment, in addition to or as a replacement of the water dump and water fill doors other water fill and/or ballast dump devices can be provided.

In an embodiment, the alignment system is suspended from the crane, e.g. from the same hoisting device as the wind turbine.

In an embodiment, the alignment system is temporarily arranged on the floating foundation.

The invention furthermore provides a floating foundation, for example for supporting a wind turbine, wherein the floating foundation is provided with one or more quick release ballast tanks for holding ballast water above the water line, the quick release ballast tanks comprising ballast water dump doors, preferably located above the water line, for dumping ballast water, e.g. during and/or just after lowering the mast onto the floating foundation to compensate for the weight transfer from the vessel to the foundation caused by the transfer of the wind turbine. The invention also relates to the use of such a floating foundation, e.g. during the installation of a wind turbine thereon. In an embodiment, the vessel used in conjunction with such a floating foundation comprises one or more quick fill water ballast tanks configured for holding ballast water below the water line, the quick fill ballast tanks comprising ballast water fill doors located below the water line for dumping sea water into the quick fill ballast tanks, e.g. during and/or just after lowering the mast onto the floating foundation in order to compensate for the weight transfer from the vessel to the foundation caused by the landing of the wind turbine on the floating foundation.

The invention also relates to a system for installation of a wind turbine on a floating foundation that is in floating condition and subject to sea-state induced motions, e.g. at the site of an offshore windfarm, wherein the wind turbine to be installed comprises at least a part of a wind turbine mast having a lower end portion, and comprises a rotor assembly with rotor blades, which rotor assembly is mounted on the wind turbine mast, wherein the floating foundation comprises a mast mounting structure configured to mount the mast of the wind turbine thereon and having an upwardly directed mounting axis, wherein the system comprises a vessel which comprises:
a floating hull,
a crane arranged on the hull,
wherein the crane is provided with a hoisting system that is adapted to support the weight of the wind turbine and suspend the wind turbine from the crane, which hoisting system is adapted to raise and lower the wind turbine in a controllable manner,
wherein the crane and/or the hoisting system thereof comprises a heave compensation device that is adapted to compensate for sea-state induced heave motion of the wind turbine mast relative to the mast mounting structure of the floating foundation,
wherein the system further comprises a mast alignment system that is configured to engage on the suspended wind turbine, e.g. on the mast of the suspended wind turbine, and to bring and maintain the mast of the wind turbine in alignment with the mounting axis of the floating foundation in order to compensate for sea-state induced motions, at least including tilt motions in one or more vertical planes, of the wind turbine mast relative to the mounting axis of the floating foundation,
wherein the system is configured to allow for a method which comprises—with the hull of the vessel in floating condition and the floating foundation in floating condition—the steps of:
suspending the wind turbine from the crane by means of the hoisting system,
positioning the lower end of the mast of the suspended wind turbine above the mast mounting structure of the floating foundation,
operating the heave compensation device so as to compensate for sea-state induced heave motion of the wind turbine mast relative to the mast mounting structure of the floating foundation,
operating the mast alignment system so as to bring and maintain the mast of the wind turbine in alignment with the mounting axis of the floating foundation in order to compensate for sea-state induced tilt motions of the wind turbine mast relative to the mounting axis of the floating foundation,
whilst the heave compensation device and the mast alignment system are in operation, operating the hoisting system and thereby lowering the suspended wind turbine with the lower end portion of the mast onto the mast mounting structure of the floating foundation
fastening the mast with the lower end portion thereof to the mast mounting structure of the floating foundation.

The system, e.g. the vessel and/or the mast alignment system thereof, may comprise one or more of the features discussed herein with reference to the inventive method.

The invention also relates to an alignment system for use in installation of a wind turbine on a floating foundation as described herein.

The invention also relates to a crane to be mounted on a vessel and an alignment system for use in installation of a wind turbine on a floating foundation as described herein.

The invention also relates to a vessel equipped with a crane and an alignment system for use in installation of a wind turbine on a floating foundation as described herein.

The invention also relates to a vessel equipped with a crane and a restraining system for use in installation of a wind turbine on a floating foundation as described herein, e.g. in absence of the alignment system as described herein.

The invention also relates to a method for creating an offshore windfarm, wherein multiple floating foundations are already present at the site of the windfarm, preferably already anchored at their final position, and wherein a vessel is used that comprises:

a floating hull having a deck,
a crane arranged on the hull,
wherein the crane is provided with a hoisting system that is adapted to support the weight of the wind turbine and suspend the wind turbine from the crane, which hoisting system is adapted to raise and lower the wind turbine in a controllable manner,
wherein the crane and/or the hoisting system thereof comprises a heave compensation device that is adapted to compensate for sea-state induced heave motion of the wind turbine mast relative to the mast mounting structure of the floating foundation,
in which method the vessel sails to the windfarm where the floating foundations are already anchored with multiple wind turbines in yet to be assembled state stored on the vessel, e.g. at least 5 wind turbines, e.g. storing separately the mast, for example upper mast parts and lower mast parts, the nacelles, and the rotor blades of at least 5 wind turbines on board the vessel,
and wherein the method comprises assembly of the to be installed wind turbine on board of the vessel,
and wherein the method comprises—with the hull of the vessel in floating condition and the floating foundation in floating condition—the steps of:
suspending the wind turbine from the crane by means of the hoisting system,
positioning the lower end of the mast of the suspended wind turbine above the mast mounting structure of the floating foundation,
operating the heave compensation device so as to compensate for sea-state induced heave motion of the wind turbine mast relative to the mast mounting structure of the floating foundation,
possibly, operating a mast alignment system so as to bring and maintain the mast of the wind turbine in alignment with the mounting axis of the floating foundation in order to compensate for sea-state induced tilt motions of the wind turbine mast relative to the mounting axis of the floating foundation,
whilst the heave compensation device and, possibly, the mast alignment system are in operation, operating the hoisting system and thereby lowering the suspended wind turbine with the lower end portion of the mast onto the mast mounting structure of the floating foundation
fastening the mast with the lower end portion thereof to the mast mounting structure of the floating foundation.

As preferred, use is made of a mast alignment system that is configured to engage on the suspended wind turbine, e.g. on the mast of the suspended wind turbine, and to bring and maintain the mast of the wind turbine in alignment with the mounting axis of the floating foundation in order to compensate for sea-state induced motions, at least including tilt motions in one or more vertical planes, of the wind turbine mast relative to the mounting axis of the floating foundation.

Preferably, all rotor blades are stored in horizontal orientation on board of the vessel, e.g. stacked along a side of the vessel, and are to be mounted to the hub, e.g. as described in NL2026734 incorporated herein by reference.

Preferably, the vessel is a semi-submersible vessel.

The invention will now be discussed with reference to the drawings.

BRIEF DESCRIPTION OF THE DRAWINGS

In the drawings:
FIGS. 14a-e illustrate the crane and the upper mast engaging device of the alignment system.

DETAILED DESCRIPTION OF EMBODIMENTS

Figure 1:
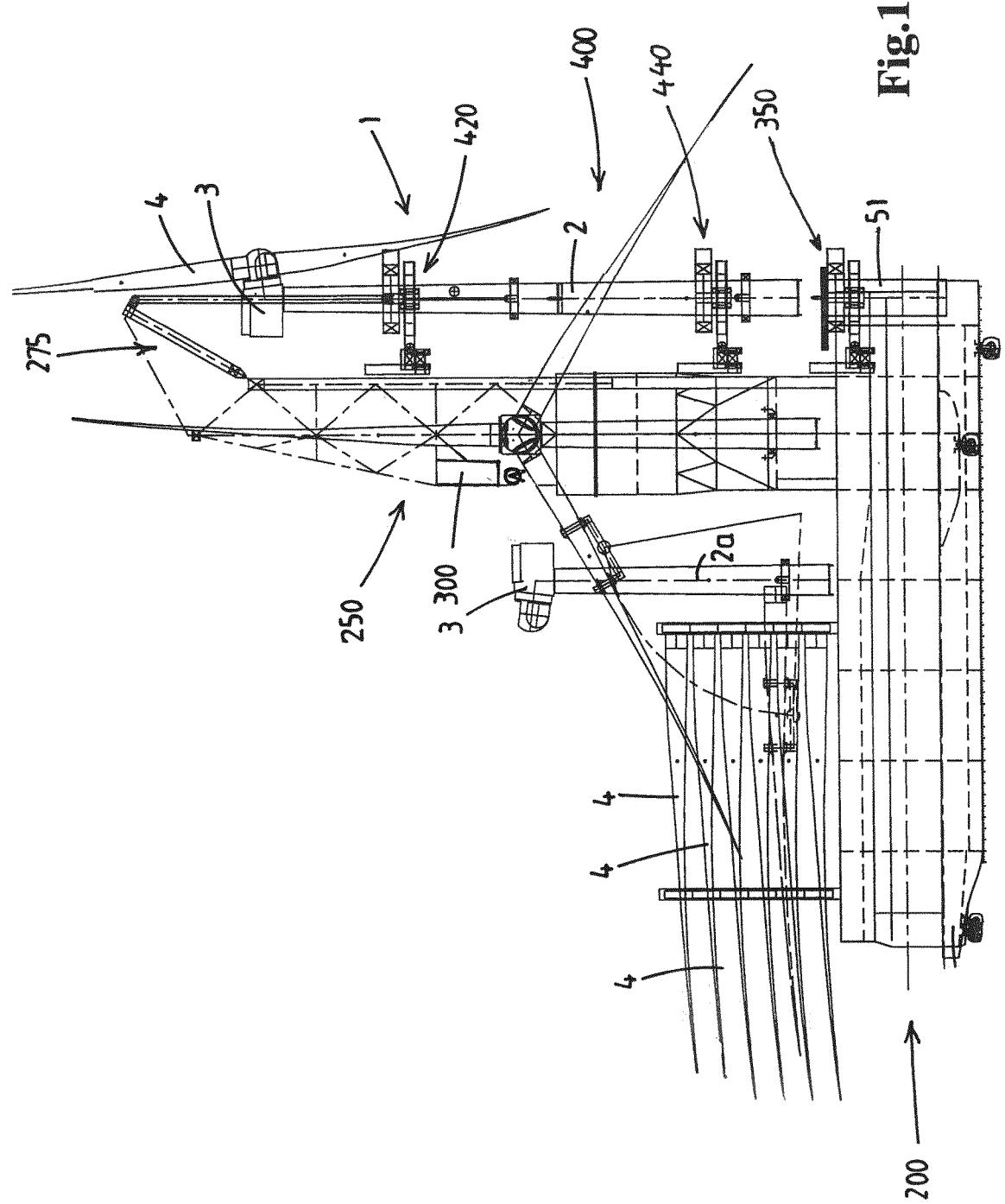
FIG. 1 illustrates the installation of a wind turbine on a floating foundation according to the invention.

In the drawings the figures illustrate the installation of a wind turbine 1 on a floating foundation 100 that is in floating condition and subject to sea-state induced motions, e.g. at the site of an offshore windfarm.

The wind turbine 1 to be installed comprises at least a part of a wind turbine mast 2 having a lower end portion, and comprises a rotor assembly, here embodied with a nacelle 3 having a hub and with rotor blades 4, which rotor assembly has been mounted on the wind turbine mast 2.

The floating foundation 50 is, by way of example, shown as being of the design discussed in WO2009/131826. One of the stabilizing columns 51 thereof at a corner of the foundation, is provided with a mast mounting structure 52 that is configured to mount the mast 2 of the wind turbine 1 thereon. This structure 52 has an upwardly directed mounting axis 53 which is the main axis along which the landing of the mast 2 onto the foundation 50 takes place.

Use is made of a vessel 200, here a semi-submersible vessel, which comprises:
a floating hull 201,
a crane 250 that is arranged on the hull.

The crane 250 is provided with a hoisting system 275 that is adapted to support the weight of the wind turbine 1 and suspend the wind turbine 1 from the crane 250, which hoisting system is adapted to raise and lower the wind turbine in a controllable manner.

The crane 250 and/or the hoisting system 275 thereof comprises a heave compensation device 300 that is adapted to compensate for sea-state induced heave motion of the wind turbine mast 2 relative to the mast mounting structure 52 of the floating foundation 50.

For example, the heave compensation device comprises one or more motion sensors for monitoring the actual heave motion(s).

Use is made of a mast alignment system 400 that is configured to engage on the suspended wind turbine, here on the mast 2 of the suspended wind turbine 1, and to bring and maintain the mast 2 of the wind turbine in alignment with the mounting axis 53 of the floating foundation in order to compensate for sea-state induced motions, at least including tilt motions in one or more vertical planes, of the wind turbine mast 2 relative to the mounting axis of the floating foundation 50.

Generally, the installation method comprises—with the hull of the vessel 200 in floating condition and the floating foundation 50 in floating condition—the steps of:
- suspending the wind turbine 1 from the crane 250 by means of the hoisting system 275,
- positioning the lower end of the mast 2 of the suspended wind turbine 1 above the mast mounting structure 52 of the floating foundation 50,
- operating the heave compensation device 300 so as to compensate for sea-state induced heave motion of the wind turbine mast 2 relative to the mast mounting structure 52 of the floating foundation 50,
- operating the mast alignment system 400 so as to bring and maintain the mast 2 of the wind turbine 1 in alignment with the mounting axis 53 of the floating foundation 50 in order to compensate for sea-state induced tilt motions of the wind turbine mast 2 relative to the mounting axis 53 of the floating foundation,
- whilst the heave compensation device 300 and the mast alignment system 400 are in operation, operating the hoisting system 275 and thereby lowering the suspended wind turbine 1 with the lower end portion of the mast 2 onto the mast mounting structure 52 of the floating foundation 50,
- fastening the mast 2 with the lower end portion thereof to the mast mounting structure 52 of the floating foundation.

It is preferred, that at least the mast alignment system 400 remains in operation during a part or all of the fastening step, e.g. the system 400 serving or assisting in stabilizing of the wind turbine relative to the foundation during this step.

It is preferred, that at least the heave compensation device 300 remains in operation during a part or all of the fastening step, e.g. the device 300 serving or assisting in supporting at least part of the weight of the wind turbine relative to the foundation also during this step, e.g. serving or assisting in the gradual transfer of the weight of the wind turbine onto the foundation, e.g. whilst ballasting the vessel to compensate for this transfer.

As can be seen, the floating foundation is restrained by a restraining system 350 at least, or solely, in the horizontal plane relative to the vessel 200 during the wind turbine installation process.

As an example, the restraining system for the foundation involves the use of a vessel mounted gripper device 351, which gripper device has an engagement member 352 that engages on the floating foundation, here on the mast mounting structure 52 of the floating foundation. The gripper device 351 has an actively controlled motion mechanism 353, e.g. similar of design to those of the mast engaging devices 420, 440, that is configured and operated to provide a controlled motion of the engagement member 352 relative to the hull of the vessel 200 and thereby effects a controlled restraining of the engaged floating foundation relative to the hull of the vessel.

Figure 2:
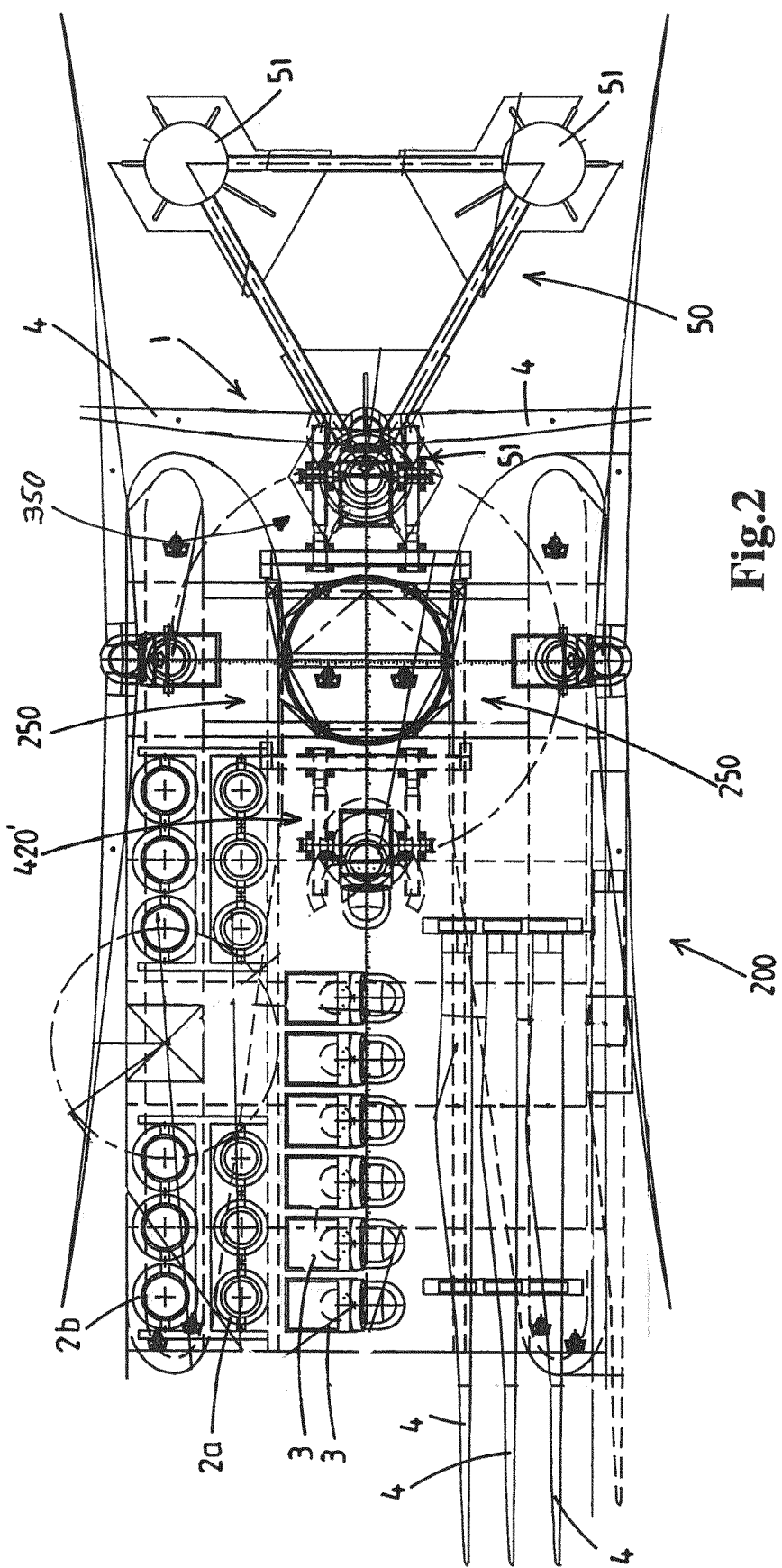
FIG. 2 illustrates the installation in a view from above.
Figure 3:
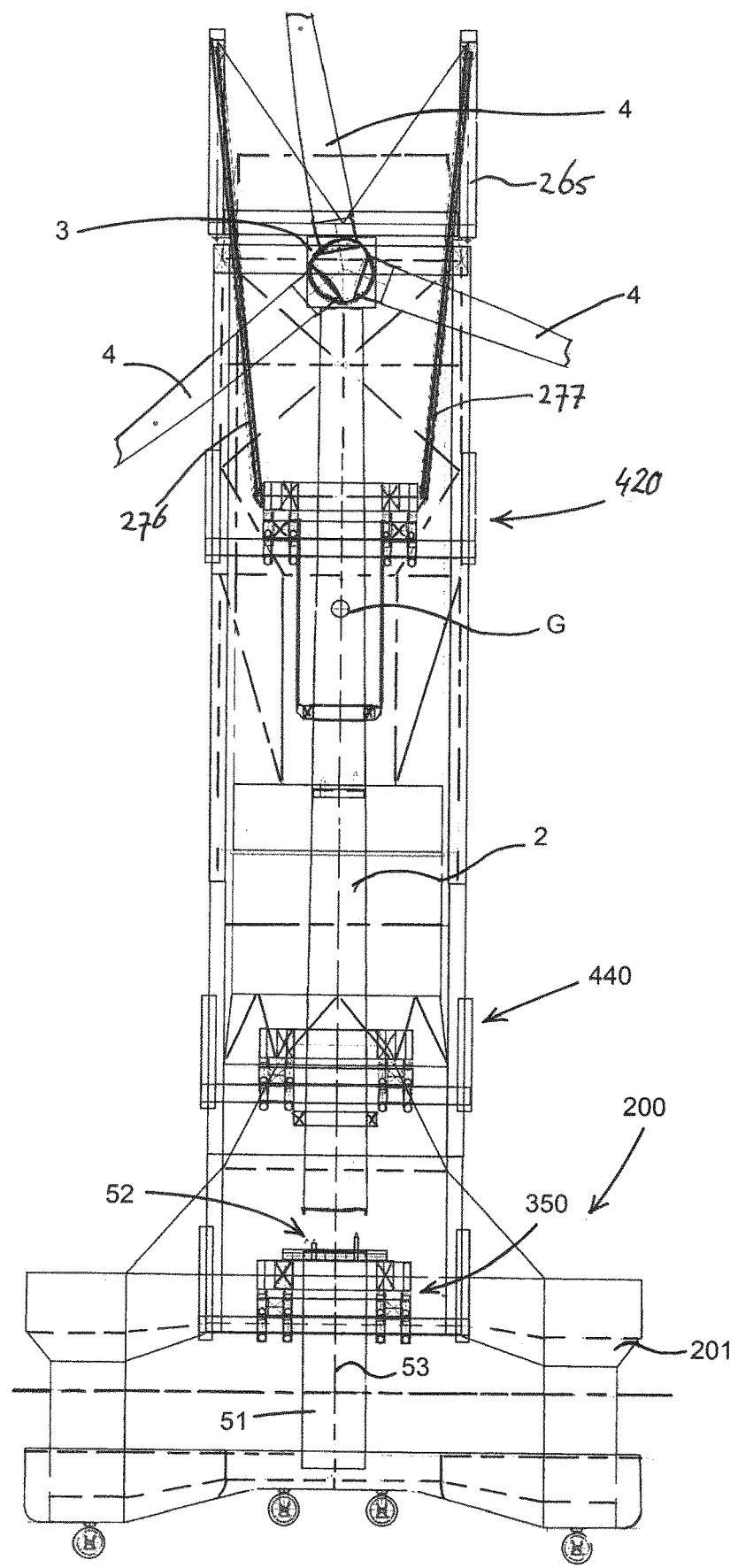
FIG. 3 illustrates the installation in a front view with the wind turbine suspended from the crane of the vessel in a plumb line orientation.
Figure 4:
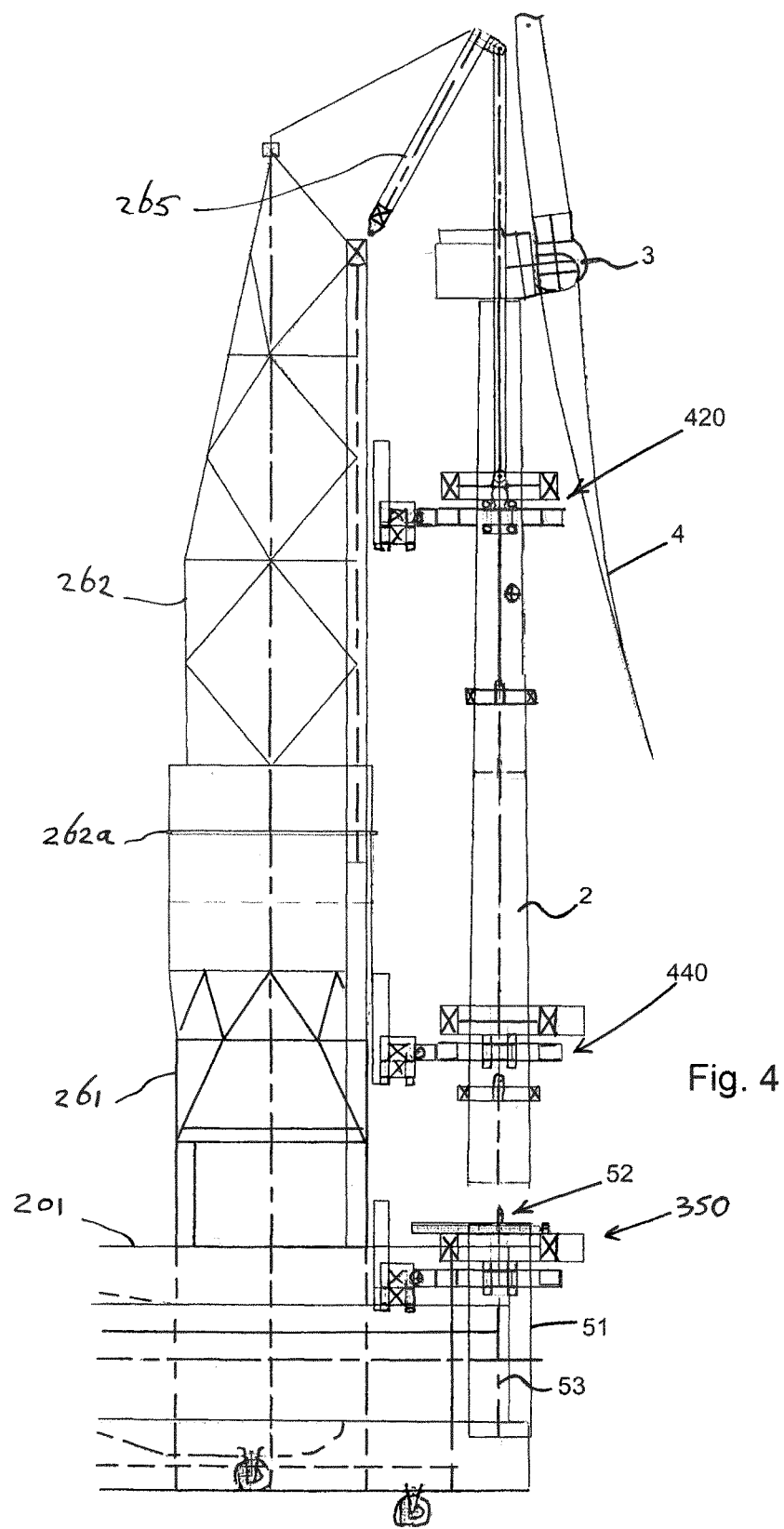
FIG. 4 illustrates the installation of FIG. 3 in a side view.
Figure 5:
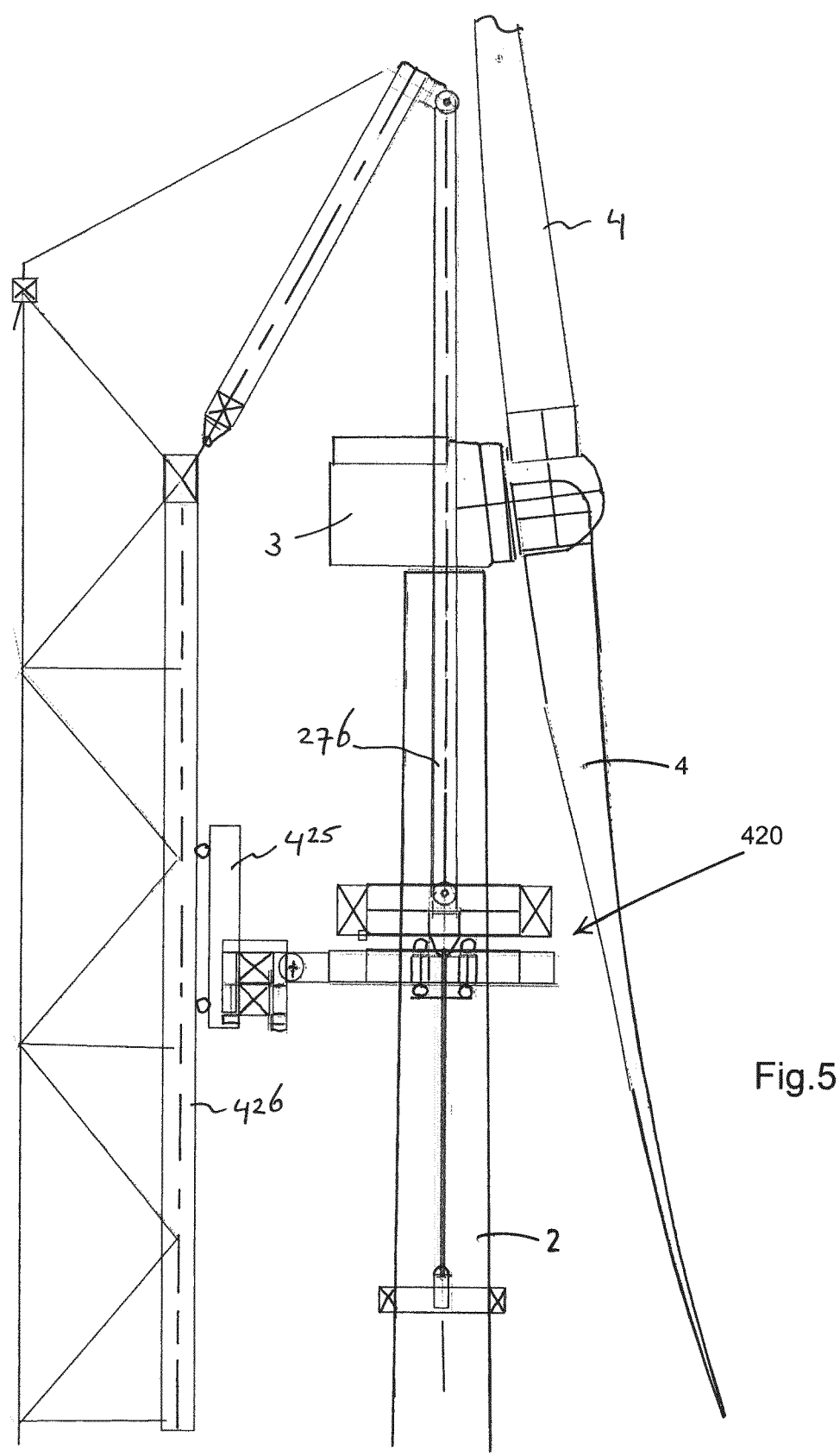
FIG. 5 is an enlargement of a portion of FIG. 4 illustrating the upper mast engaging device and the suspension of the wind turbine.
Figure 6:
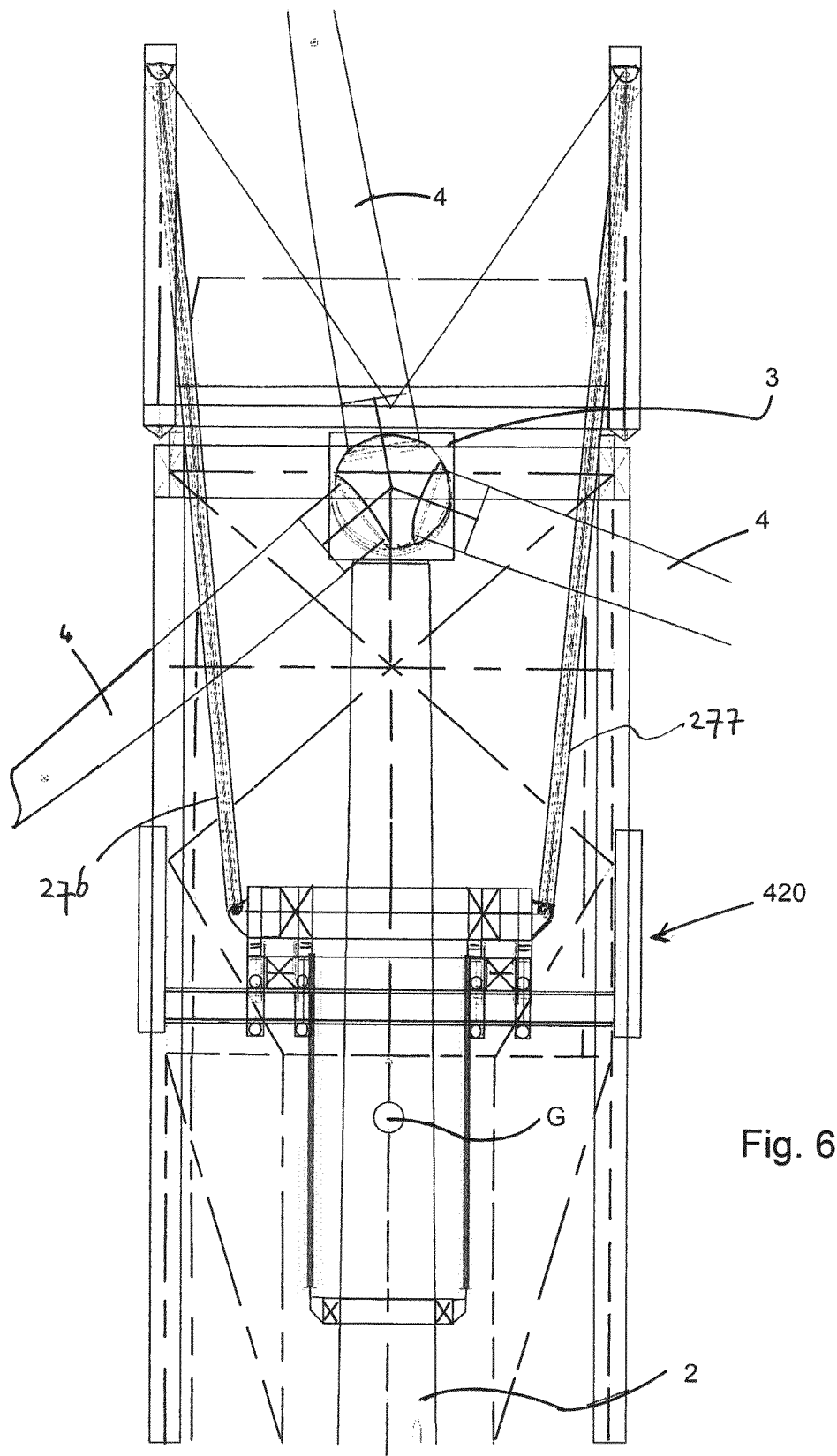
FIG. 6 shows the portion of FIG. 5 in a front view.
Figure 7:
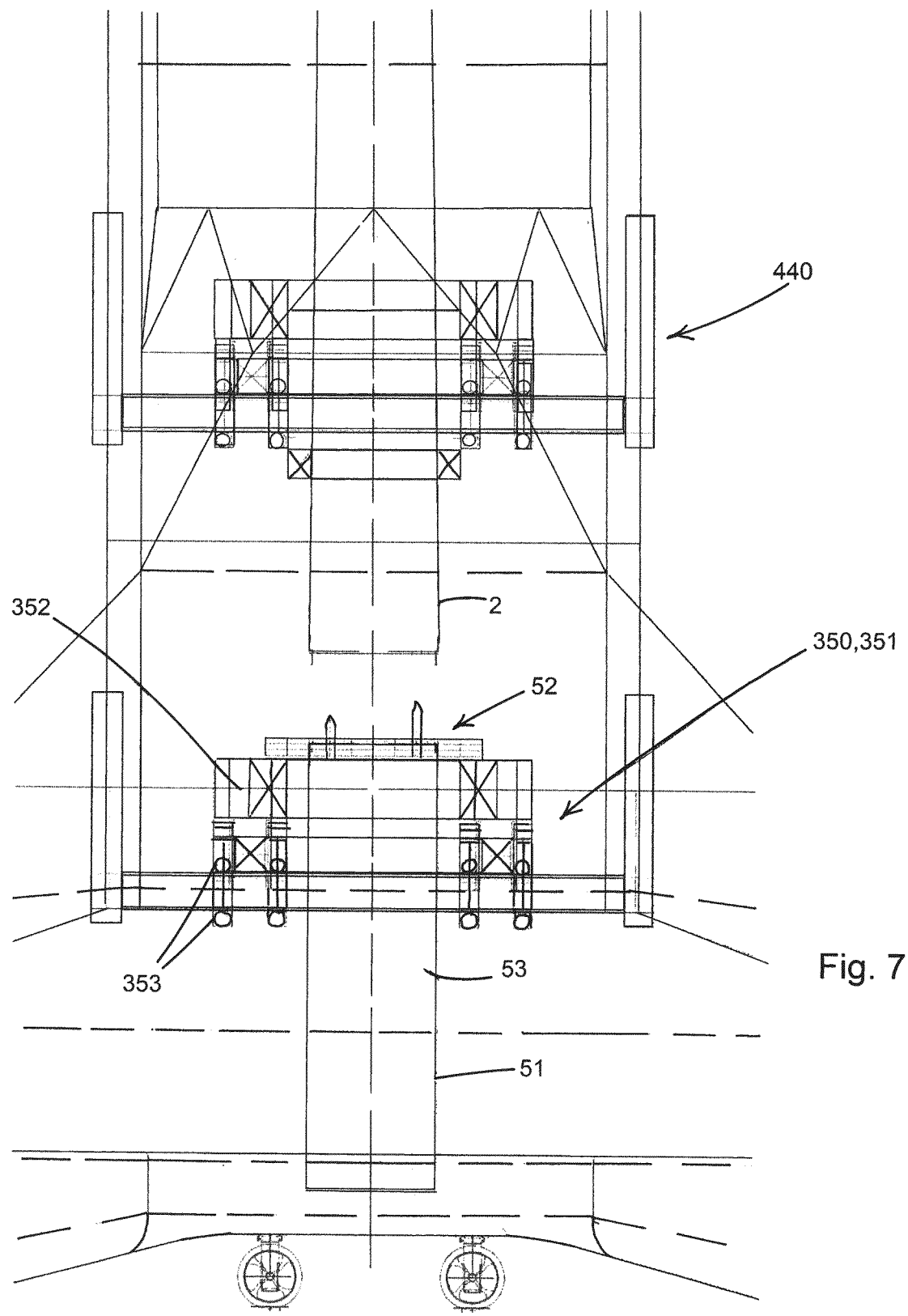
FIG. 7 is an enlargement of a portion of FIG. 4 illustrating the lower mast engaging device and the restraining system that acts on a stabilizing column of the floating foundation.
Figure 8:
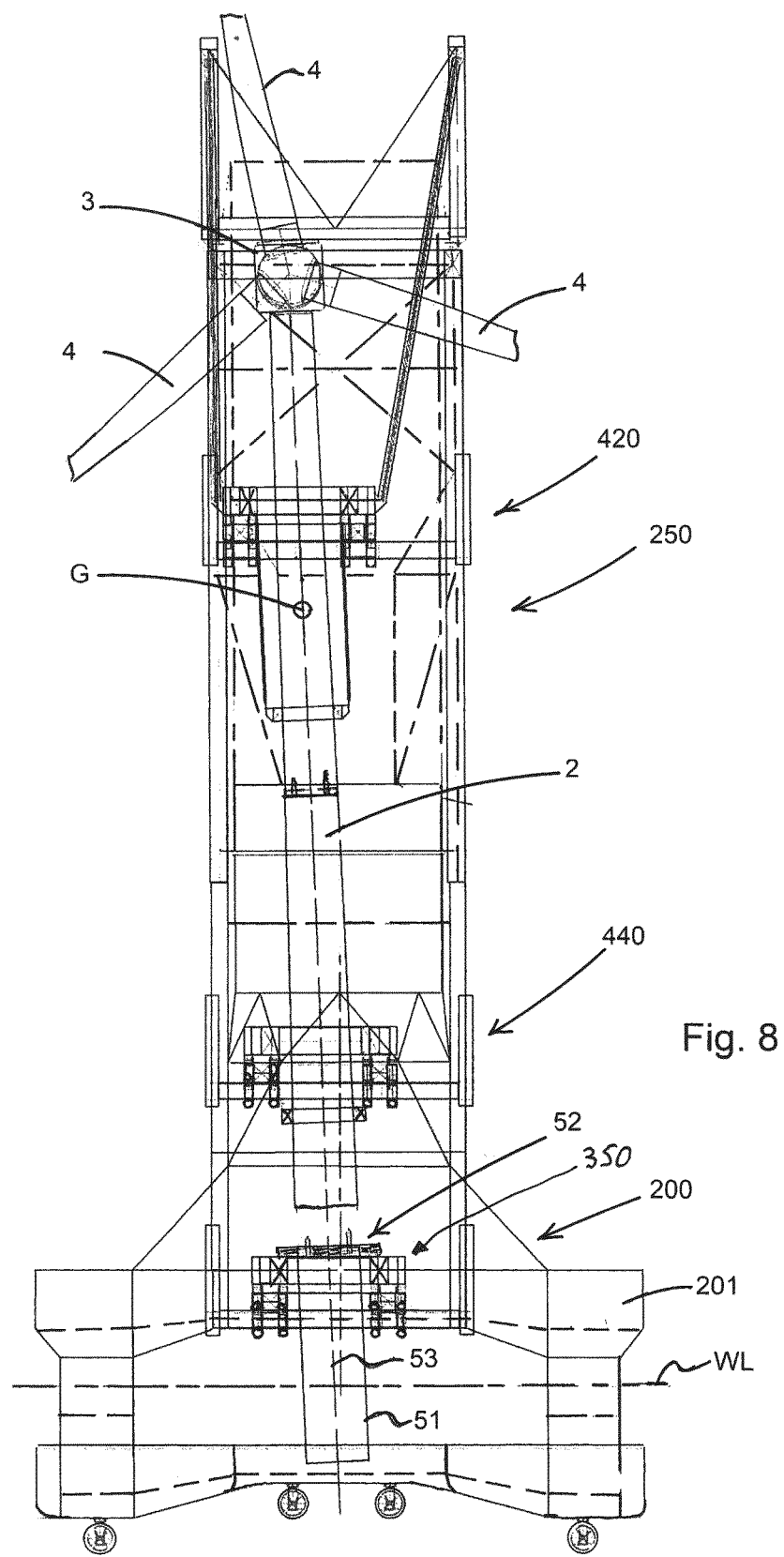
FIG. 8 illustrates the operation of the alignment system of the invention in a front view.
Figure 9:
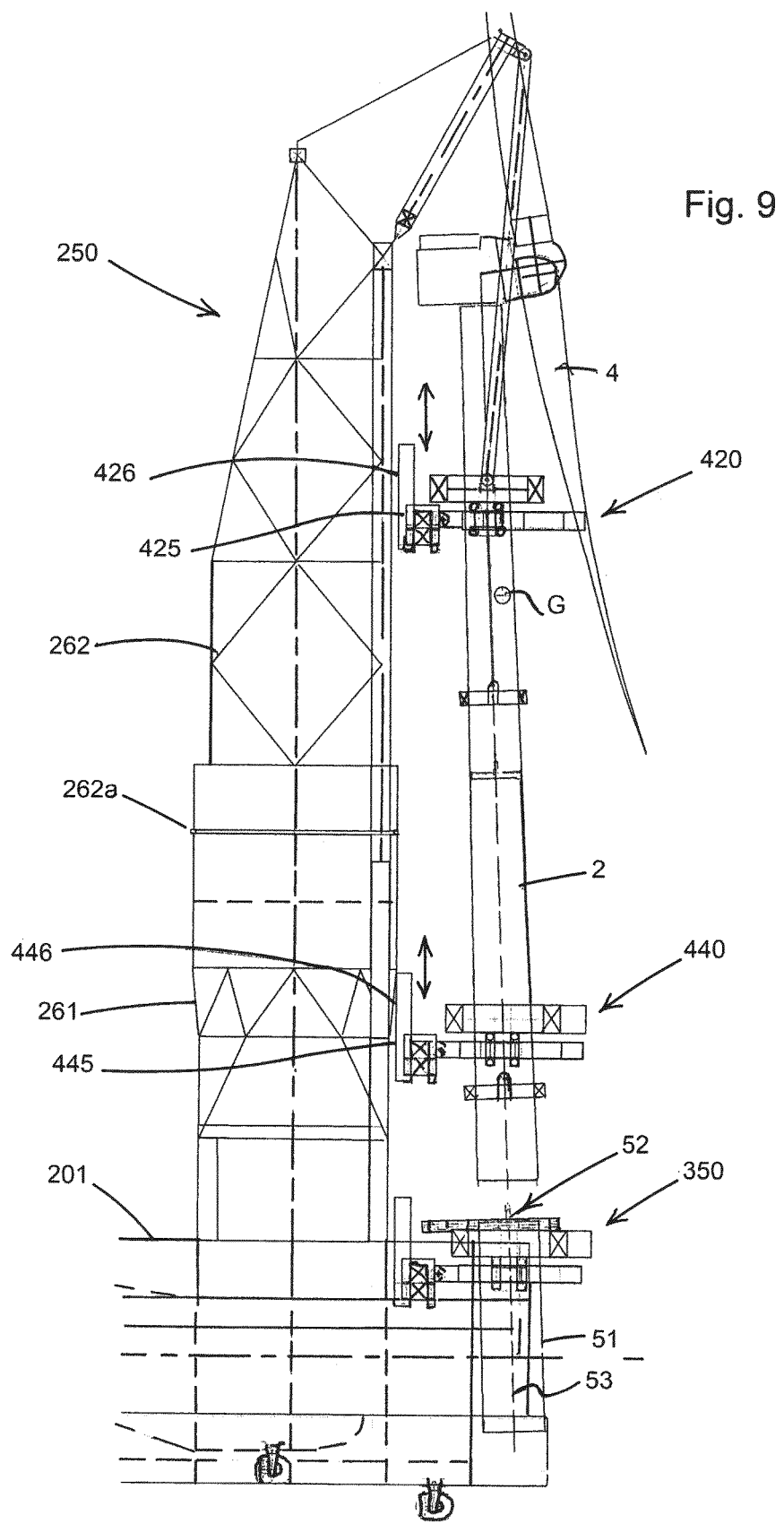
FIG. 9 illustrates the operation of the alignment system of the invention in a side view.
Figure 10:
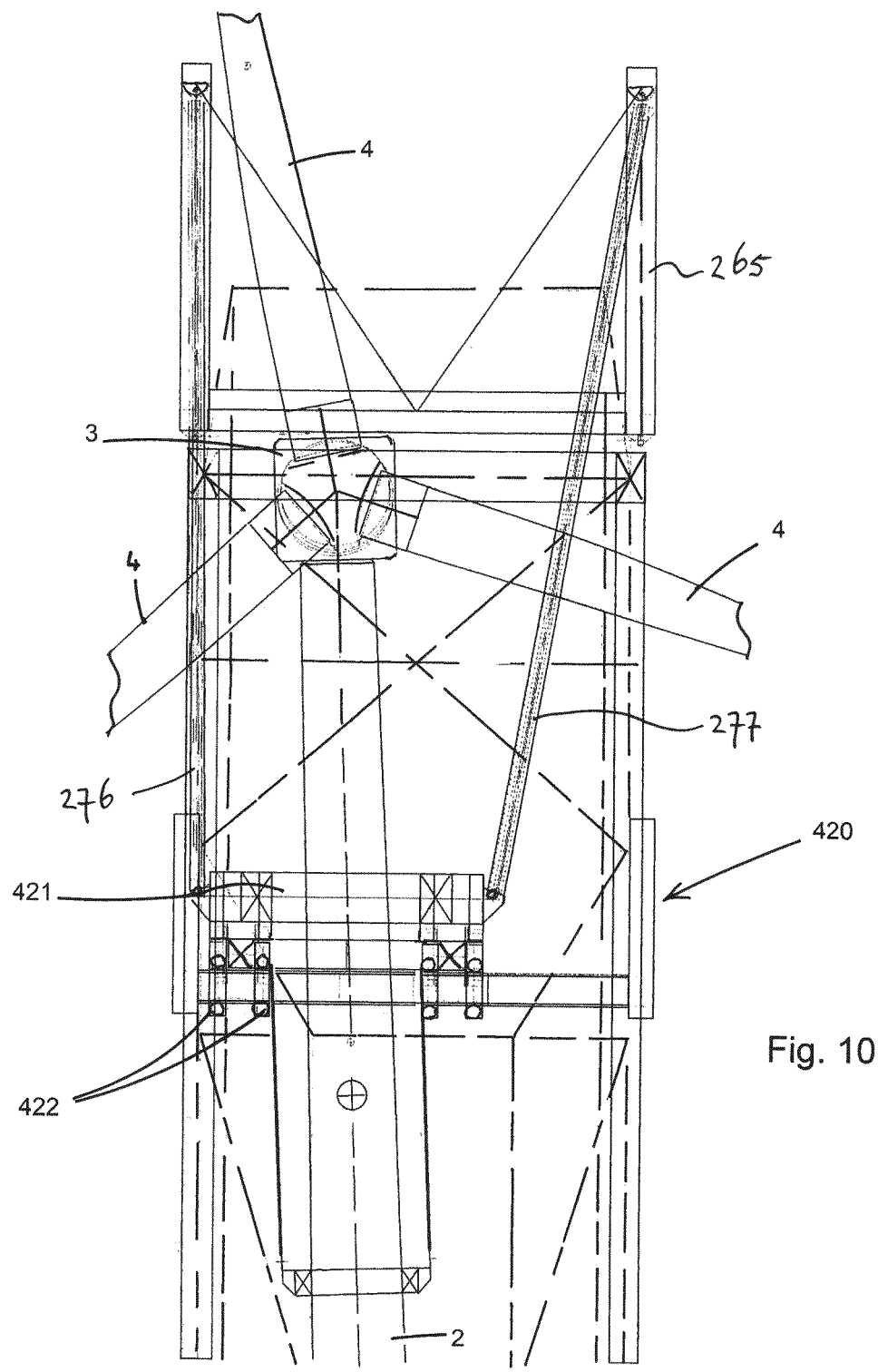
FIG. 10 is an enlargement of a portion of FIG. 8 illustrating the upper mast engaging device.
Figure 11:
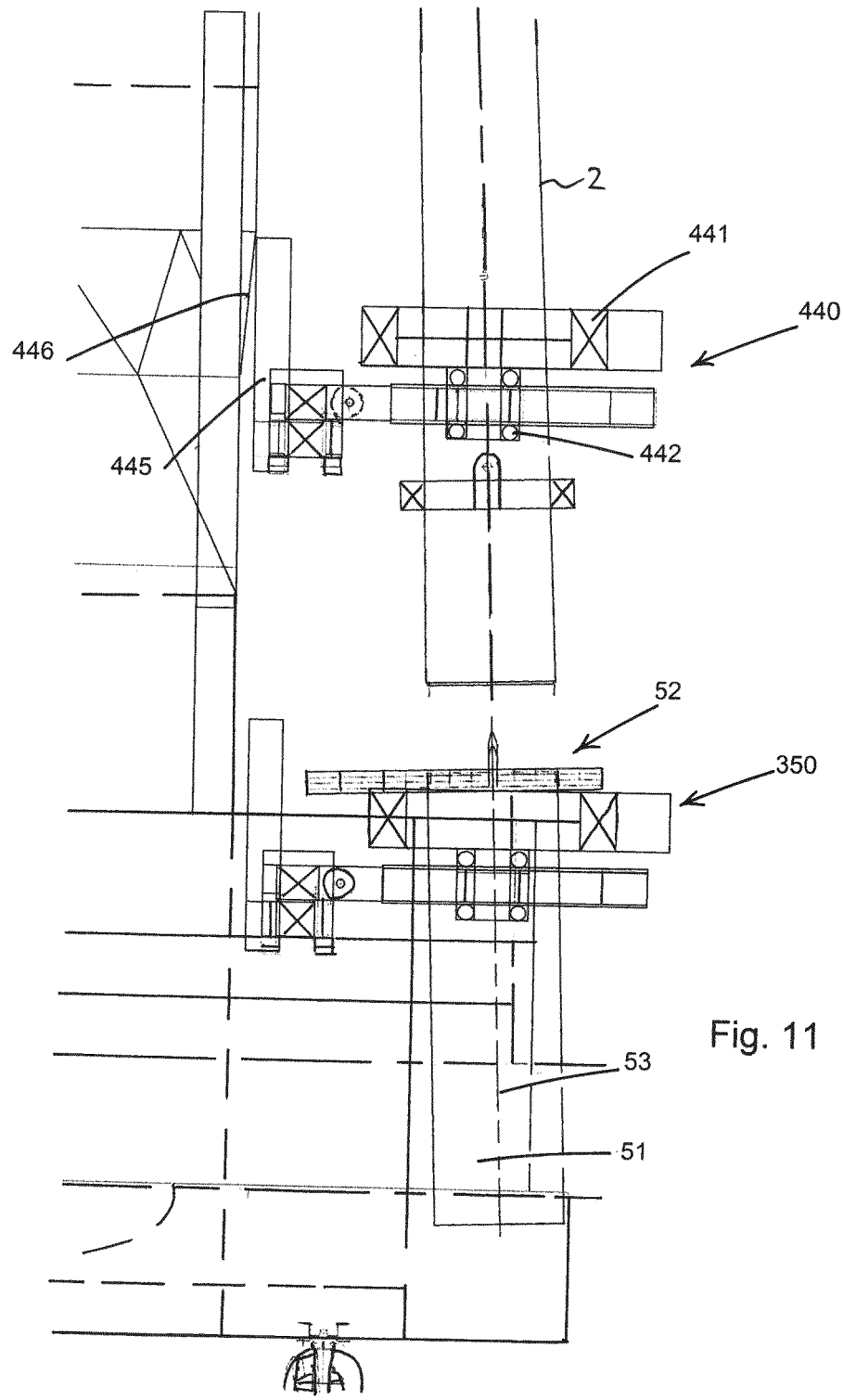
FIG. 11 is an enlargement of a portion of FIG. 9 illustrating the lower mast engaging device and the restraining system that acts on a stabilizing column of the floating foundation.
Figure 12:
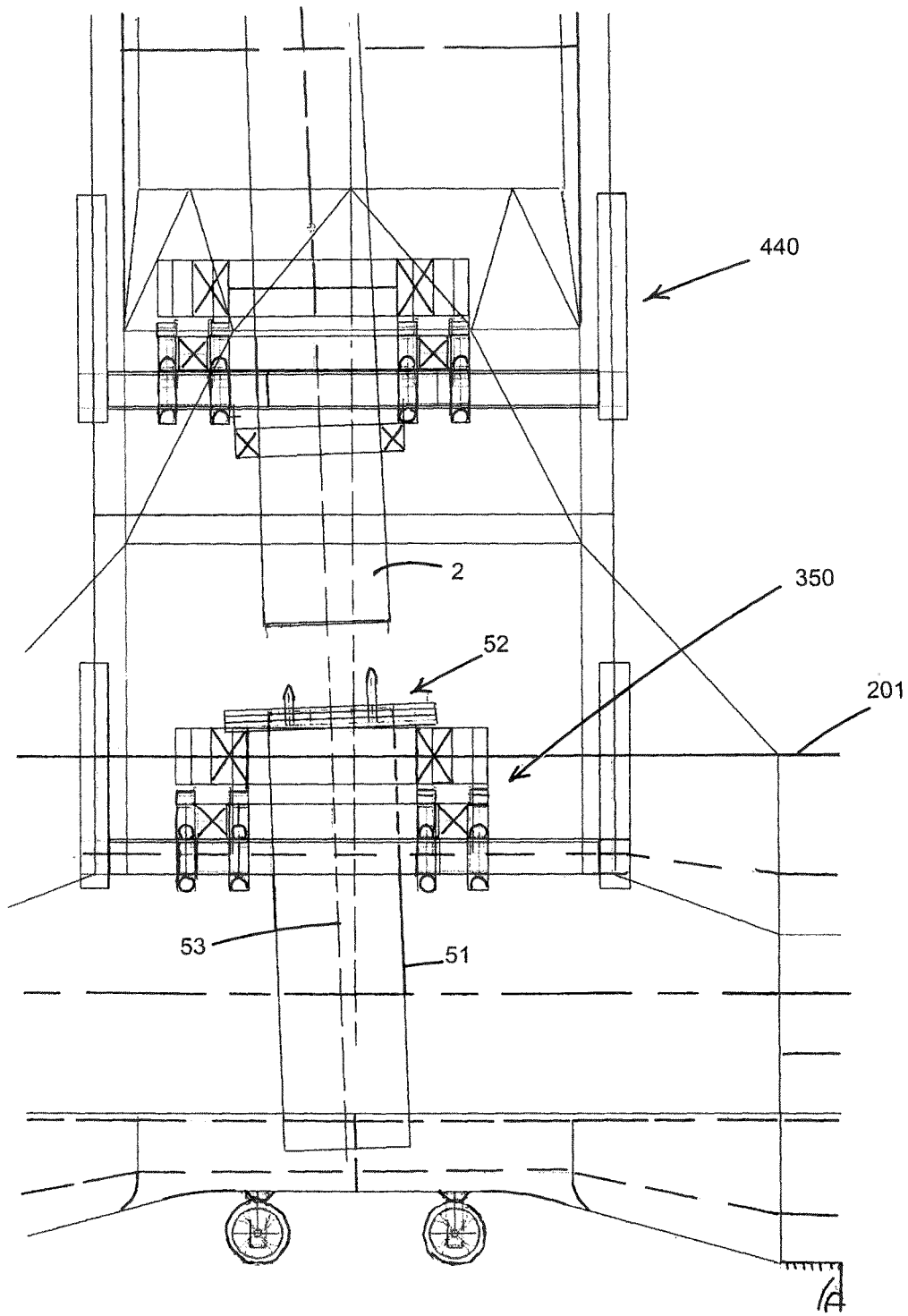
FIG. 12 shows the portion of FIG. 11 in front view,
FIGS. 13a,b,c illustrate the upper mast engaging device of the alignment system.

As can be seen in FIGS. 1 and 2, it is envisaged in this example, that the assembly of the wind turbine 1 to be installed is done onboard the vessel 200. The vessel sails to the windfarm where the floating foundations are already present, e.g. anchored, with multiple wind turbines 1 in yet to be assembled state stored on the vessel.

For example, the main components of at least 5 wind turbines are stored separately on board, here upper mast parts 2a and lower mast parts 2b, nacelles 3, and rotor blades 4.

As preferred, multiple floating foundations 50 are already anchored at their final location in an offshore windfarm, all without wind turbine 1, and the vessel 200 sails to the windfarm and successively the wind turbines are assembled on board and then installed on the floating foundations 50.

As preferred, the landing of the mast 2 onto the mast mounting structure 52 causes, or is followed by, a preliminary fastening between the mast and the foundation being established, so that the wind turbine is stable relative to the foundation, e.g. allowing for ceasing the operation of the alignment system 400, e.g. allowing for disengaging the alignment system.

The alignment system 400 shown by way of example, comprises an upper mast engaging device 420 as well as a lower mast engaging device 440, each having a mast engagement member 421, 441 as well as an actively controlled motion mechanism 422, 442 that is configured and operated to provide a controlled motion of the mast engagement member in a horizontal plane.

The mast engaging devices 420, 440 act on the mast 2 at different heights, e.g. the lower one below the centre of gravity G of the wind turbine 1 to be installed and the upper one above said centre of gravity G.

The actively controlled motion mechanisms 422, 442 are configured and operated to bring and maintain the mast 2 of the suspended wind turbine 1 in alignment with the mounting axis 53 of the floating foundation 50 during the relevant moments of the installation process.

Figure 13A:
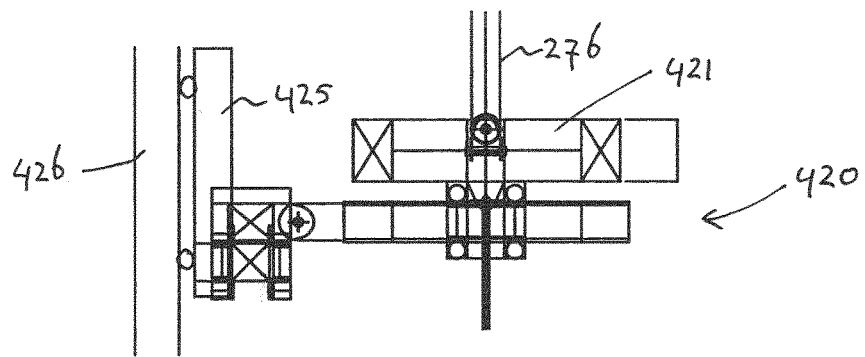
Figure 13B:
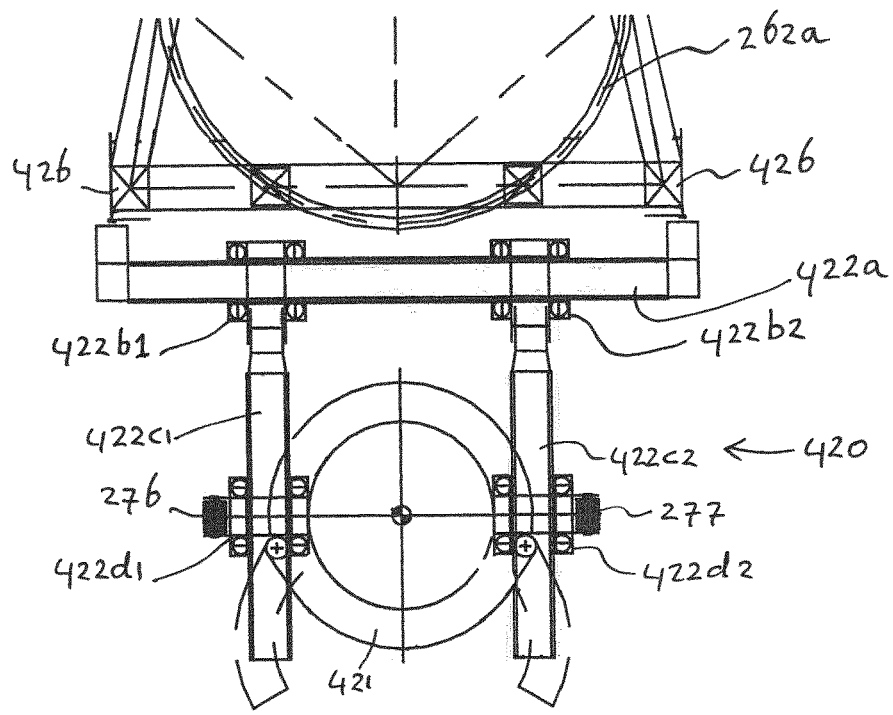
Figure 13C:
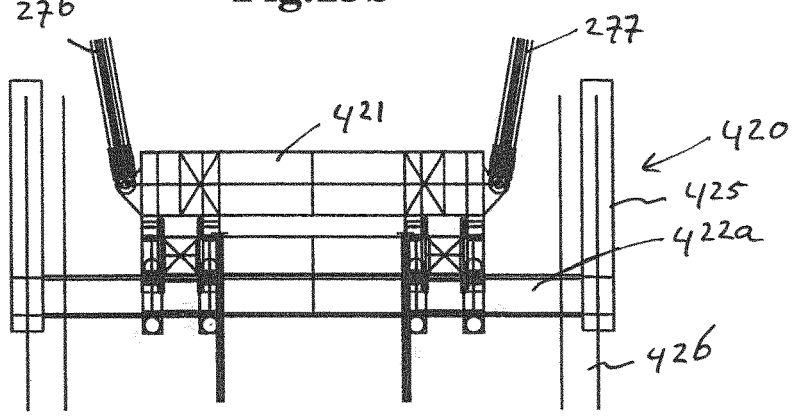

It is illustrated, e.g. in FIGS. 13*a-c*, that each actively controlled horizontal motion mechanism 422, 442 comprises a first set of one or more horizontal tracks 422*a* extending in a first horizontal direction, said first set supporting at least one first carrier 422*b*1, 422*b*2, and said one or more first carriers supporting a second set of one or more horizontal tracks 422*c*1, 422*c*2 extending in a second horizontal direction different from the first direction, e.g. the first and second direction being orthogonal directions, the second set of one or more horizontal tracks supporting one or more further second carriers 422*d*1, 422*d*2 supporting the mast engagement device 421, 441.

It is illustrated that each mast engaging device 420, 440 of the alignment system 400 comprises a trolley 425, 445 that is vertically guided along one or more vertical guide rails 426, 446 here mounted to the crane structure of the crane 250. Each trolley supports the mast engaging member with interposition of the actively controlled motion mechanism between the trolley and the mast engaging member to provide a controlled motion of the mast engagement member in a horizontal plane, e.g. in two orthogonal horizontal directions.

The mast engaging member 421 is suspended from the crane 250 by means of the hoisting device upper and the wind turbine 1 is suspended from this mast engaging member 421.

The crane has a vertical crane structure 260 that is erected on the hull of the vessel. Here the vertical crane structure has a lower section 261 of the crane structure fixed on the hull and a slewable top section 262 on slew bearing 262*a*.

The hoisting device comprises one or more winch drive cables 276, 277 depending from sheave blocks 278, 279 arranged on the slewable top section, here on a forked pivotal jib 265 of the slewable top section.

The slewing of the top section 262 may be used to pick-up an assembled wind turbine 1 from the deck of the vessel 200 by means of the hoisting device and to bring the wind turbine with its mast above the mast mounting structure of the floating foundation 50.

It is shown that the slewable top section 262 of the vertical crane structure is provided with the upper mast engaging device 420 and that the fixed lower section 261 of the vertical crane structure is provided with a lower mast engaging device 440.

Figure 15:
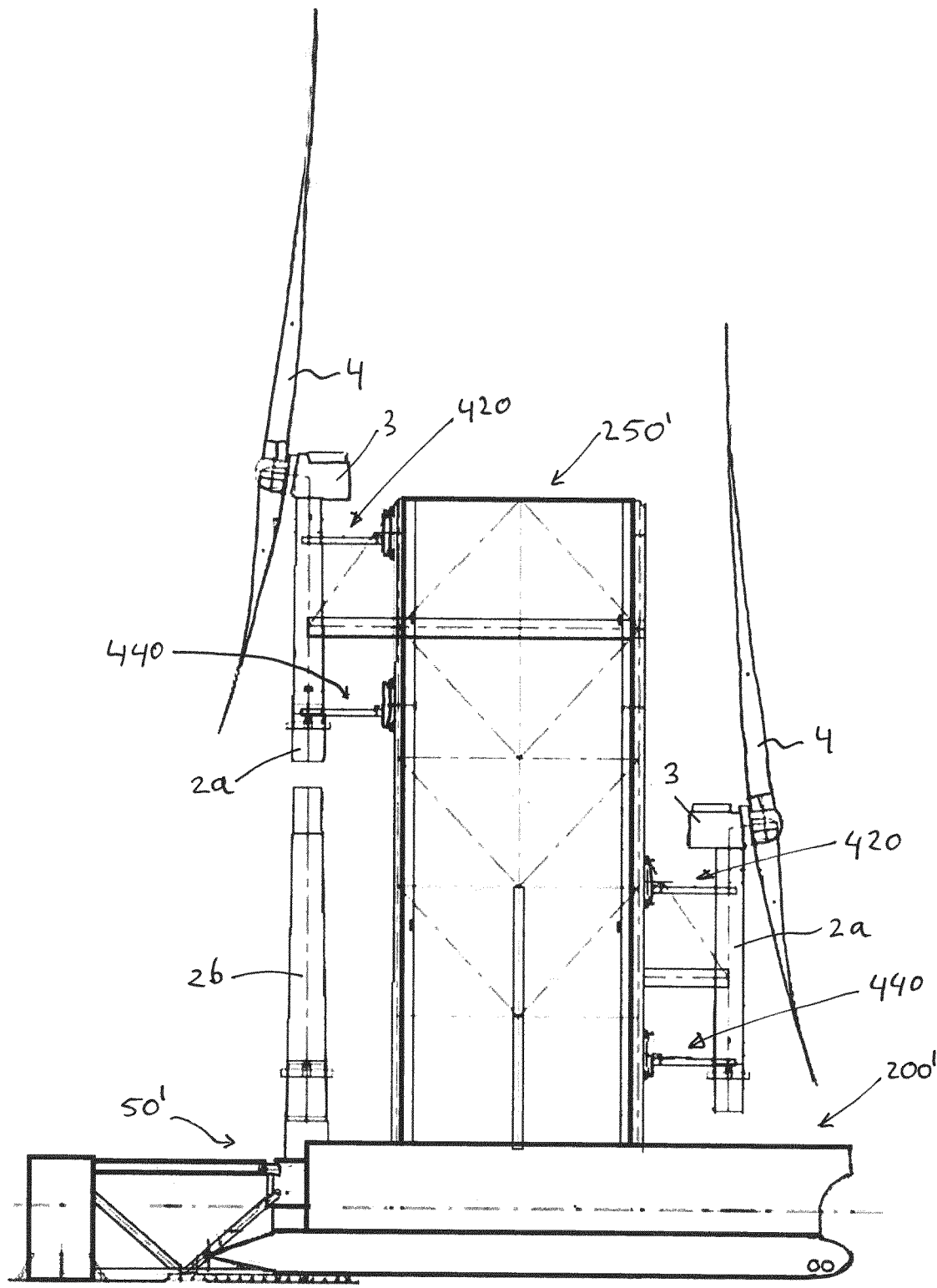
FIG. 15 illustrates the installation of a pre-assembly of an upper mast part, nacelle, and rotor blades on a floating foundation already provided with a lower mast part,
FIGS. 16a, b illustrate the operation of the alignment system in the method of FIG. 15.
Figure 16A:
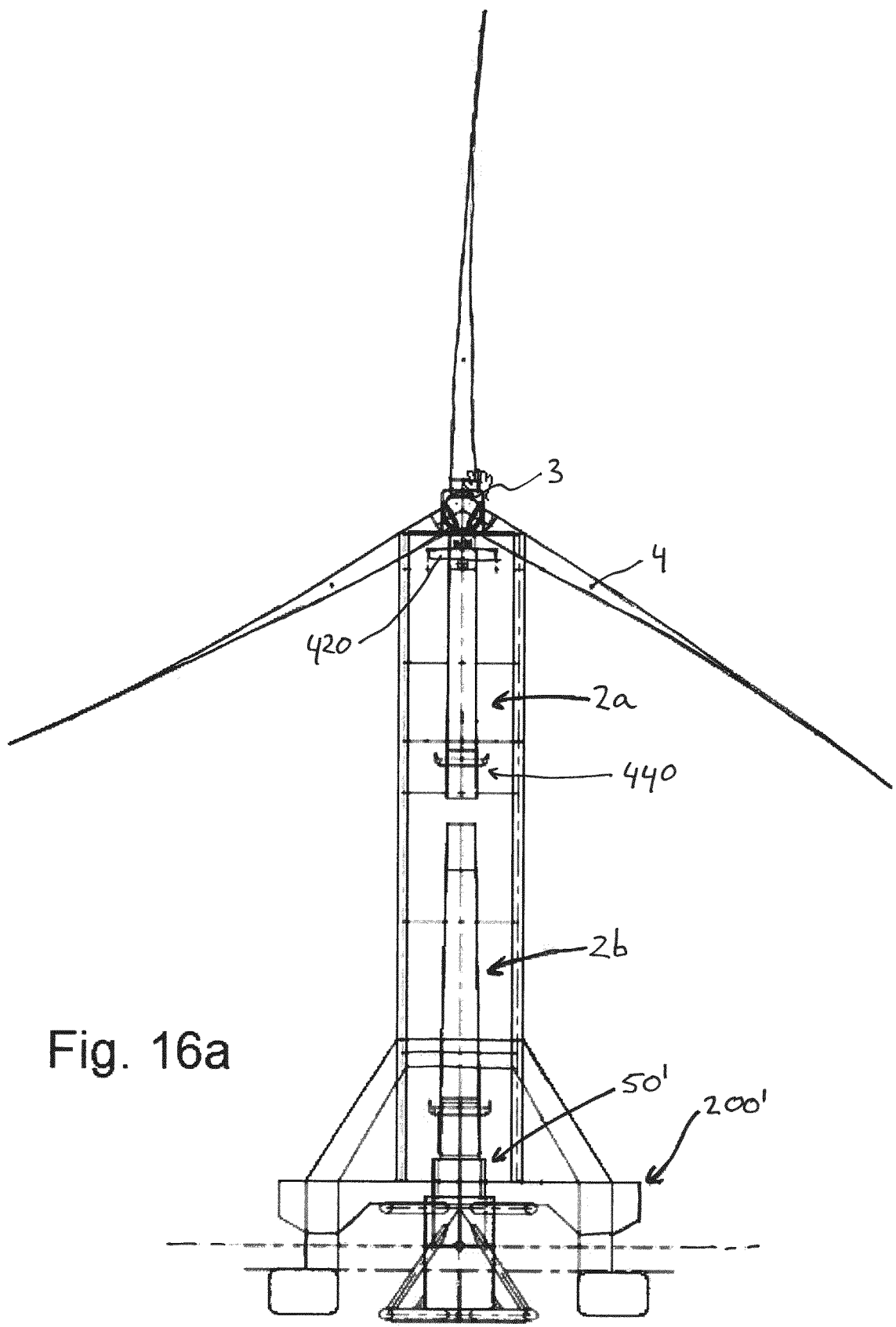
Figure 16B:
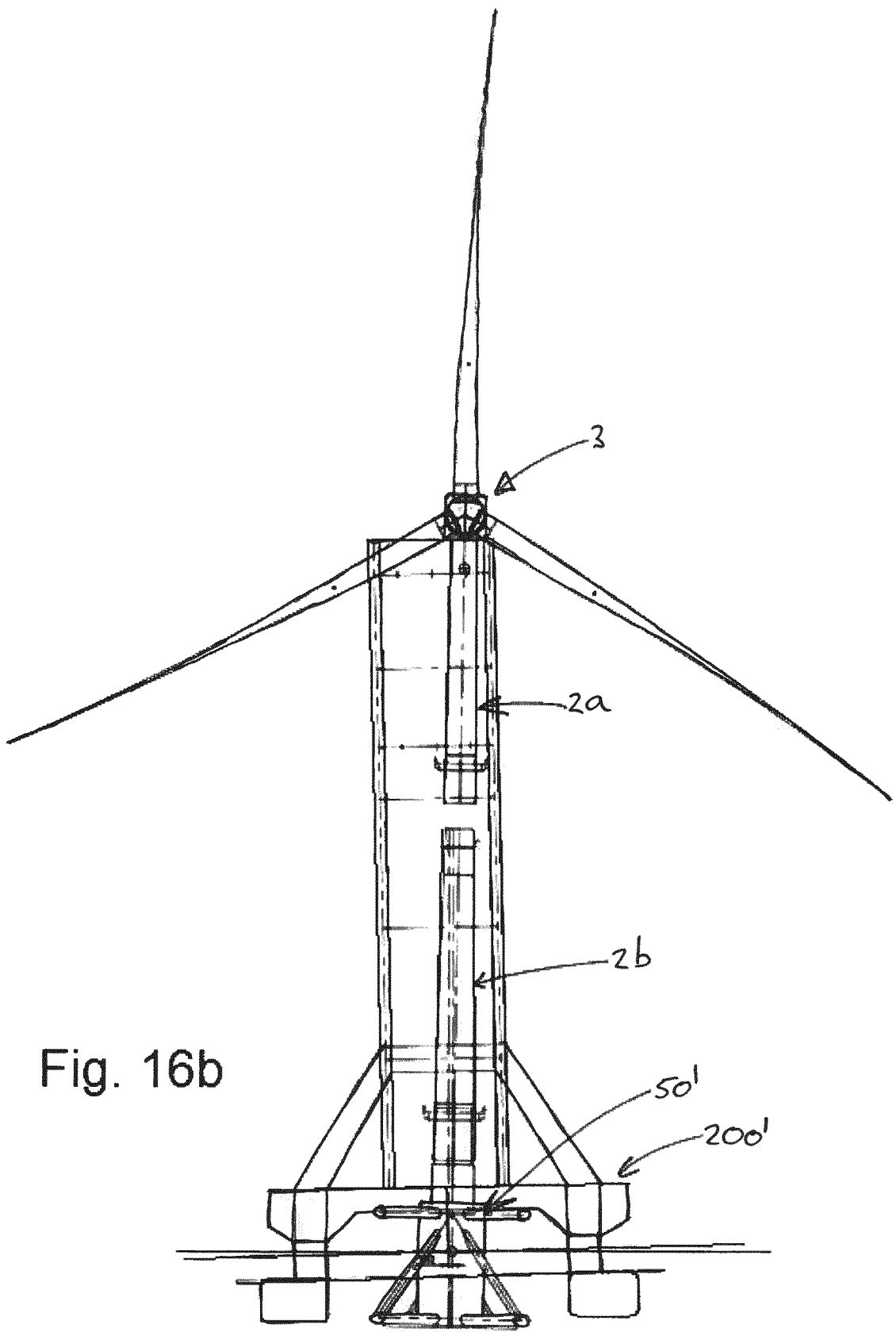

With reference to FIGS. 15, 16*a*, 16*b*, now the installation of a wind turbine on a floating foundation 50' will be discussed. As shown, the lower mast part 2*b* has already be mounted on the foundation 50', e.g. during production of the foundation 50' or at sea, e.g. using the vessel 200' used for completion of the wind turbine or another offshore vessel, e.g. equipped with a general-purpose heavy lift crane.

The FIGS. 15, 16*a*, 16*b* illustrate that a pre-assembled assembly of the upper mast part 2*a*, nacelle 3, and rotor blades 4 is handled as a subassembly or a unit by the crane 250' of the vessel 200' for placing this unit on top of the lower mast 2*b*. It is shown, as an option, that the crane structure of the crane 250 is configured to handle two of such assemblies at the same time. Here the left-hand assembly in FIG. 15 is supported in an operation position above a lower mast part 2*b* already mounted on the floating foundation 50' and the right-hand one is supported in a transport position, at a lower level than the operative position for reasons of vessel stability.

For example, using the vessel 200' a method for installation of the wind turbine can be performed which comprises, with the hull of the vessel 200' as well as the foundation 50' in floating condition, the steps of:
- transporting the wind turbine assembly (or assemblies) in the lower transport position (right-hand in FIG. 15) from a pre-assembly location to the installation location where the foundation 50' is present, e.g. at the wind farm,
- moving the vessel 200' into position relative to the foundation 50' and keeping the vessel in such relative position, preferably involving the use of a restraining device 350, 351 as described herein.
- lifting the wind turbine assembly from the lower transport position into the raised operation position (left-hand FIG. 15) and positioning the wind turbine assembly above the lower mast part 2*b* already mounted on the foundation 50', e.g. involving moving the vessel 200' relative to the (moored) foundation 50'.

The method further comprises—as follows from FIGS. 16*a*, *b*—that due to operation of the two active horizontal motion devices 420, 440 engaging on the subassembly that is to be installed, the upper mast part 2*a* is brought and kept in alignment with the lower mast part 2*a* (at some distance above the top end of the lower mast part) so as to compensate for sea-state induced motions, e.g. including tilt motions of the foundation and/or vessel due to sea state as illustrated. It is submitted that the subassembly is preferably engaged by the two devices 420, 440 as balancing only this assembly is effectively more difficult than balancing a wind turbine comprising a full-length mast. For example, there is a vertical spacing between the devices 420, 440 engaging on the subassembly of at least 20 meters.

The crane 250', preferably, is also equipped with a heave compensation device associated so as to compensate for sea-state induced vertical motion of the lower end of the upper mast part 2*a* relative to the lower mast part 2*b* that is mounted on the floating foundation.

FIG. 16*b* illustrates that the two active horizontal motion devices 420, 440 are operated to maintain alignment of the mast parts, ahead and also during (the first phase at least) the lowering of the assembly onto the top of the lower mast part 2*b*.

In a preferred embodiment, the vessel 200' is stabilized by suitable operation of one or more damping devices, e.g. roll and/or pitch motion damping devices. For example, the vessel 200' is equipped with a roll damping device that comprises one or more mobile solid ballast bodies guided on a track on the hull, and an associated displacement drive and displacement drive control, said drive control being adapted to cause motion of said one or more solid ballast bodies so as to compensate for sea-state induced vessel roll motion. For example, the vessel further comprises at least one pitch damping device comprising one or more mobile solid ballast bodies guided on a track and an associated displacement drive and displacement drive control, said drive control being adapted to cause motion of said one or more solid ballast bodies so as to compensate for sea-state induced vessel pitch motion.

The invention claimed is:

1. A method for installation of a wind turbine on a floating foundation that is in floating condition and subject to sea-state induced motions,
   wherein the wind turbine to be installed comprises at least a part of a wind turbine mast having a lower end portion, and comprises a rotor assembly with rotor blades, the rotor assembly being mounted on the wind turbine mast,
   wherein the floating foundation comprises a mast mounting structure configured to mount the mast of the wind turbine thereon and having an upwardly directed mounting axis,
   wherein use is made of a vessel which comprises:
   a floating hull; and
   a crane arranged on the hull,
   wherein the crane is provided with a hoisting system adapted to support a weight of the wind turbine and suspend the wind turbine from the crane, the hoisting system being adapted to raise and lower the wind turbine in a controllable manner,
   wherein the crane comprises a heave compensation device that is adapted to compensate for sea-state induced heave motion of the wind turbine mast relative to the mast mounting structure of the floating foundation,
   wherein the vessel comprises a mast alignment system configured to engage on the mast of the suspended wind turbine and to bring and maintain the mast of the wind turbine in alignment with the mounting axis of the floating foundation in order to compensate for sea-state induced motions, at least including tilt motions in one or more vertical planes, of the wind turbine mast relative to the mounting axis of the floating foundation,
   wherein the method comprises, with the hull of the vessel in floating condition and the floating foundation in floating condition, the steps of:
   restraining the floating foundation in a horizontal plane relative to the vessel by a restraining system;

suspending the wind turbine from the crane by means of the hoisting system;

positioning the lower end of the mast of the suspended wind turbine above the mast mounting structure of the floating foundation;

operating the heave compensation device so as to compensate for sea-state induced heave motion of the wind turbine mast relative to the mast mounting structure of the floating foundation;

operating the mast alignment system so as to bring and maintain the mast of the wind turbine in alignment with the mounting axis of the floating foundation in order to compensate for sea-state induced tilt motions of the wind turbine mast relative to the mounting axis of the floating foundation;

whilst the heave compensation device and the mast alignment system are in operation, operating the hoisting system and thereby lowering the suspended wind turbine with the lower end portion of the mast onto the mast mounting structure of the floating foundation; and fastening the mast with the lower end portion thereof to the mast mounting structure of the floating foundation.

2. The method according to claim 1, wherein the mast alignment system is also configured and operated to compensate for sea-state induced horizontal motions of the wind turbine mast relative to the mounting axis of the floating foundation in at least one horizontal direction.

3. The method according to claim 1, wherein multiple floating foundations are anchored a respective final location in an offshore windfarm, all said floating foundations without wind turbine, and wherein the vessel sails to the windfarm and successively the wind turbines are installed on the floating foundations.

4. The method according to claim 1, wherein landing the mast onto the mast mounting structure causes, or is followed by, a preliminary fastening between the mast and the floating foundation being established, so that the wind turbine is stable relative to the floating foundation, and wherein subsequently the operation of the alignment system is ceased.

5. The method according to claim 1, wherein at least the mast alignment system remains in operation during a part of or all of the fastening step, the mast alignment system serving or assisting in stabilizing of the wind turbine relative to the foundation during the fastening step.

6. The method according to claim 1, wherein at least the heave compensation device remains in operation during a part or all of the fastening step, the heave compensation device serving or assisting in supporting at least part of a weight of the wind turbine relative to the foundation also during the fastening step.

7. The method according to claim 1, wherein the floating foundation is restrained by the restraining system solely in the horizontal plane relative to the vessel.

8. The method according to claim 1, wherein the restraining system comprises multiple mooring lines extending in different directions and being arranged between the floating foundation on the one hand and the hull of the vessel on the other hand, so as to provide a coupling of the floating foundation and the hull at least in the horizontal plane.

9. The method according to claim 1, wherein the restraining system comprises a vessel mounted gripper device, the gripper device having an engagement member that engages on the floating foundation, and the gripper device having an actively controlled motion mechanism configured and operated to provide a controlled motion of the engagement member relative to the hull of the vessel and thereby effects a controlled restraining of the engaged floating foundation relative to the hull of the vessel.

10. The method according to claim 1, wherein the alignment system comprises at least one mast engaging device having a mast engagement member and an actively controlled motion mechanism configured and operated to provide a controlled motion of the mast engagement member in the horizontal plane so as to bring and maintain the mast of the suspended wind turbine in alignment with the mounting axis of the floating foundation.

11. The method according to claim 10, wherein each actively controlled horizontal motion mechanism comprises a first set of one or more horizontal tracks extending in a first horizontal direction, said first set of one or more horizontal tracks supporting at least one first carrier, and said at least one first carrier supporting a second set of one or more horizontal tracks extending in a second horizontal direction different from the first direction, the second set of one or more horizontal tracks supporting one or more second carriers supporting said mast engagement device.

12. The method according to claim 10, wherein each mast engaging device of the alignment system comprises a trolley vertically guided along one or more vertical guide rails, the trolley supporting the mast engaging member with interposition of the actively controlled motion mechanism between the trolley and the mast engaging member to provide a controlled motion of the mast engagement member in a horizontal plane.

13. The method according to claim 1, wherein the alignment system comprises an upper mast engaging device and a lower mast engaging device, each of the upper mast engaging device and the lower mast engaging device having a mast engagement member and an actively controlled motion mechanism configured and operated to provide a controlled motion of the mast engagement member in a horizontal plane, wherein the mast engaging devices act on the mast at different heights, and wherein the active controlled motion mechanisms are operated to bring and maintain the mast of the suspended wind turbine in alignment with the mounting axis of the floating foundation.

14. The method according to claim 1, wherein the alignment system comprises an upper mast engaging device, which comprises a trolley vertically guided along one or more vertical guide rails, the trolley supporting the mast engaging member with interposition of an actively controlled motion mechanism between the trolley and the mast engaging member to provide a controlled motion of the mast engagement member in a horizontal plane, wherein the wind turbine is suspended from the mast engaging member, and wherein the mast engaging member is suspended from the crane by the hoisting device.

15. The method according to claim 1, wherein the crane is provided with first and second upper sheave blocks that are horizontally spaced apart, wherein the mast engaging member is provided with first and second lower sheave blocks that are horizontally spaced apart, wherein a first multiple fall cable arrangement extends the between the first upper and lower sheave blocks and a second multiple fall cable arrangement extends between the second upper and lower sheave blocks, and wherein the mast is suspended from the mast engaging member.

16. The method according to claim 1, wherein the crane has a vertical crane structure erected on the hull of the vessel, wherein the vertical crane structure has a lower section of the crane structure fixed on the hull and a slewable top section, wherein the hoisting device comprises one or more winch drive cables depending from one or more sheave blocks arranged on the slewable top section, wherein slewing of the top section is used to pick-up an assembled wind turbine from a deck of the vessel by the hoisting device and to bring the wind turbine with the mast thereof above the mast mounting structure of the floating foundation.

17. The method according to claim 16, wherein the alignment system is mounted on the vertical crane structure of the crane, and wherein, the slewable top section of the vertical crane structure is provided with an upper mast engaging device and the fixed lower section of the vertical crane structure is provided with a lower mast engaging device.

18. The method according to claim 1, wherein the vessel is a semi-submersible vessel with a pair of parallel, laterally spaced buoyant pontoons and with a row of multiple columns supported by and extending upwardly from each pontoon, and a deck structure supported by the upper ends of said columns, and wherein the crane is mounted on the deck structure of the hull.

19. The method according to claim 18, wherein the floating foundation has a stabilizing column at a corner thereof, seen from above, on which the wind turbine is to be installed, and wherein the semi-submersible vessel is arranged with the pontoons on opposite sides of said stabilizing column, corner and wherein the crane suspends the mast of the wind turbine above the mast mounting structure on said stabilizing column.

20. The method according to claim 1, wherein use is made of one or more sensors to monitor motion in one or more directions of the mast mounting structure relative to the lower end portion of the mast floating foundation during installation, wherein said one or more sensors are linked to a computerized controller which is configured and operated to cause automated operation of the mast alignment system.

21. The method according to claim 1, wherein assembly of the wind turbine to be installed is done onboard the vessel, wherein the vessel sails to the windfarm where the floating foundations are already anchored, with multiple wind turbines in yet to be assembled state stored on the vessel, storing separately the mast, nacelles, and rotor blades of at least five wind turbines on board the vessel.

* * * * *